US011982289B2

(12) United States Patent
Kim et al.

(10) Patent No.: US 11,982,289 B2
(45) Date of Patent: May 14, 2024

(54) BLOWER

(71) Applicant: LG ELECTRONICS INC., Seoul (KR)

(72) Inventors: Jaehyeon Kim, Seoul (KR); Haein Jung, Seoul (KR); Kibbum Park, Seoul (KR); Yongmin Kim, Seoul (KR); Seungho Baek, Seoul (KR); Kidong Kim, Seoul (KR); Seokho Choi, Seoul (KR); Hyungho Park, Seoul (KR); Hoojin Kim, Seoul (KR); Siyoung Oh, Seoul (KR); Hosik Jang, Seoul (KR); Chiyoung Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/141,105

(22) Filed: Apr. 28, 2023

(65) Prior Publication Data
US 2023/0265860 A1 Aug. 24, 2023

Related U.S. Application Data

(63) Continuation of application No. 17/318,222, filed on May 12, 2021, now Pat. No. 11,655,826.

(30) Foreign Application Priority Data

May 14, 2020 (KR) .................. 10-2020-0057726
Jun. 2, 2020 (KR) .................. 10-2020-0066278
(Continued)

(51) Int. Cl.
*F04D 29/40* (2006.01)
*F04D 25/08* (2006.01)

(52) U.S. Cl.
CPC .......... *F04D 29/403* (2013.01); *F04D 25/08* (2013.01)

(58) Field of Classification Search
CPC .... F04D 25/08; F04D 25/0606; F04D 29/441; F04D 29/703; F04D 25/10; F04D 25/14;
(Continued)

(56) References Cited

U.S. PATENT DOCUMENTS 8,167,542 B1   5/2012   Owusu
10,184,495 B2  1/2019   Iyer
(Continued)

FOREIGN PATENT DOCUMENTS

CN   202673799   1/2013
CN   204152819   2/2015
(Continued)

OTHER PUBLICATIONS

European Search Report issued in Application No. 21173539.4 dated Nov. 24, 2021.
(Continued)

*Primary Examiner* — Aaron R Eastman
(74) *Attorney, Agent, or Firm* — KED & ASSOCIATES, LLP

(57) ABSTRACT

A blower may include a base, a case provided above the base and having an air inlet and an air outlet, a fan provided inside the case, a rotating plate connected to the case and provided to be rotatable above the base, a motor to rotate the rotating plate, and a bearing provided between the rotating plate and the base, fixed to the rotating plate, and supported movably on the base.

14 Claims, 25 Drawing Sheets

(30) Foreign Application Priority Data

Jun. 2, 2020 (KR) .................. 10-2020-0066279
Jun. 2, 2020 (KR) .................. 10-2020-0066280
Oct. 26, 2020 (KR) .................. 10-2020-0139361

(58) Field of Classification Search
CPC .... F04D 29/524; F04D 29/403; F04D 29/582;
F05F 2250/411; F04F 5/16; F04F 5/44;
F04F 5/466; F24F 8/10; F24F 1/0014;
F05D 2250/411; Y02B 30/70
See application file for complete search history.

(56) References Cited

U.S. PATENT DOCUMENTS

2017/0248153 A1* 8/2017 Park .................. B01D 46/58
2017/0248339 A1   8/2017 Mun
2020/0158357 A1   5/2020 Son

FOREIGN PATENT DOCUMENTS

| | | |
|---|---|---|
| CN | 105485063 | 4/2016 |
| CN | 206877265 | 1/2018 |
| CN | 207526670 | 6/2018 |
| CN | 209586730 | 11/2019 |
| EP | 3 211 343 | 8/2017 |
| GB | 2 484 274 | 4/2012 |
| GB | 2 516 058 | 1/2015 |
| JP | 5342060 | 11/2013 |
| JP | 2017-109158 | 6/2017 |
| JP | 2019-025040 | 2/2019 |
| KR | 20-1995-0004561 | 2/1995 |
| KR | 10-2011-0099318 | 9/2011 |
| KR | 10-2013-0033435 | 4/2013 |
| KR | 10-1370267 | 3/2014 |
| KR | 10-1814574 | 1/2018 |
| KR | 10-2018-0125425 | 11/2018 |
| KR | 10-2019-0119565 | 10/2019 |
| KR | 10-2020-0043737 | 4/2020 |
| TW | 258294 | 9/1995 |
| TW | I563181 | 12/2016 |

OTHER PUBLICATIONS

Taiwan Office Action issued in Application No. 110116978 dated Jun. 21, 2022.

* cited by examiner

US 11,982,289 B2

BLOWER

CROSS-REFERENCE TO RELATED APPLICATIONS

This application is a continuation of U.S. patent application Ser. No. 17/318,222, filed on May 12, 2021, which claims priority under 35 U.S.C. § 119 to Korean Application Nos. 10-2020-0057726 filed on May 14, 2020, 10-2020-0066278 filed on Jun. 2, 2020, 10-2020-0066279 filed on Jun. 2, 2020, 10-2020-0066280 filed on Jun. 2, 2020, and 10-2020-0139361 filed on Oct. 26, 2020, whose entire disclosures are hereby incorporated by reference.

BACKGROUND

1. Field

The present disclosure relates to a blower.

2. Background

A blower may create a flow of air to circulate air in an indoor space, or to guide an air flow toward a user. When the blower is provided with a filter, the blower may improve indoor air quality by purifying contaminated air in a room. To adjust a flow direction of the air discharged from the blower, a main body of the blower may be rotated, and the blower may be provided with a bearing that supports a rotation of the main body.

However, when structures for improving a air blowing or discharging performance and filtering performance are additionally provided in the main body, there may be no durable bearing structure capable of supporting an increased load. In addition, a position of the motor that rotates the main body may be limited to avoid interference with a rotating plate.

Korean Patent Registration No. 10-1814574 discloses a bearing structure that supports a rotation of the blower and a motor that is provided on the base to provide rotational force. Because the bearing is provided in the center of the main body, a load of the body distributed outward may not be evenly supported in a radial direction evenly. In addition, an inner space of an annular bearing may be wasted, and space efficiency may be compromised or reduced because the motor may have to be installed on the base to avoid interference with the bearing and the rotating plate. In addition, a use life of the bearing and the main body may be reduced due to friction between the structures during rotation because a spacing between the non-rotating structure and the rotating structure may not be sufficient or secured.

Korean Patent Registration 10-1370267 discloses a bearing structure that supports the shaft to rotate smoothly within the sleeve, however the entire load of the body is not supported.

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

Figure 1:
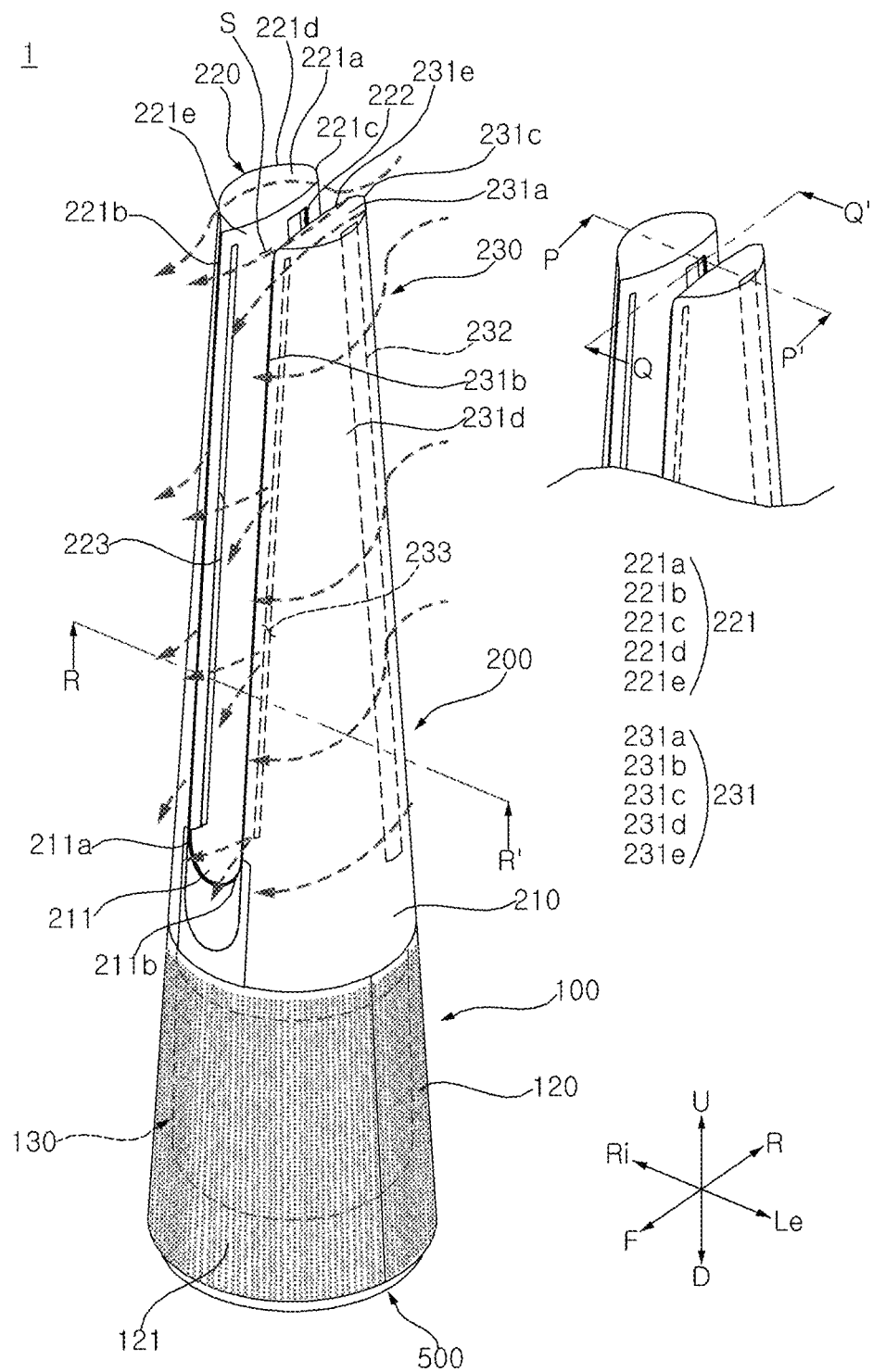
FIG. 1 is a perspective view of a blower or air purifier according to an embodiment.

Referring to FIG. 1, the blower 1 may alternatively be referred to or implemented as an air conditioner, an air clean fan, or an air purifier where air is suctioned and the suctioned air is circulated.

The blower 1 according to embodiments herein may include a suction module or assembly 100 through which air is suctioned and a blowing module or assembly 200 through which the suctioned air is discharged. The blower 1 may have a column or cone shape whose diameter decreases upward or toward the blowing module 200, and the blower 1 may have a shape of a cone or truncated cone as a whole. As a cross-section and/or weight increases toward a bottom, a center of gravity may be lowered, reducing a risk of tipping. However, configuring the cross section to narrow toward the top is not necessary.

The suction module 100 may have a cross-sectional arear or diameter that gradually decreases the top. The blowing module 200 may also have a cross-sectional area or diameter that gradually decreases toward the top. The blowing module 200 may be provided above the suction module 100, and diameters of the suction module 100 and blowing module 200 may be configured such that a transition appears smooth or seamless.

The suction module 100 may include a driving unit or drive 500, a lower case 120 provided above a driving unit 500, and a filter 130 provided inside the lower case 120.

The driving unit 500 may be seated on a ground, floor, or other surface and may support a weight of the rest of the blower 1. The lower case 120 and the filter 130 may be placed in the upper side of the driving unit 500. The driving unit 500 may rotate the blower 1 by rotating the lower case 120. Such rotation may adjust a position or orientation of the blowing assembly 200 to control a direction of air flow. For example, the driving unit 500 may be used to oscillate the blower 1 back and forth between two positions.

An outer shape of the lower case 120 may be conical (or alternatively cylindrical), and a space in which the filter 130 is provided may be formed inside the lower case 120. The lower case 120 may have a suction port 121 opened to an inside of the lower case 120. A plurality of suction ports 121 may be formed along a circumferential surface of the lower case 120.

An outer shape of the filter 130 may be cylindrical (or alternatively, conical). Foreign matter contained in the air introduced through the suction port 121 may be filtered by the filter 130.

The blowing module 200 may have a slot or opening penetrating a middle portion so as to appear to be separated and having two columns extending vertically. The slot or opening may define a blowing space S described in more detail later. The blowing module 200 may include a first tower or extension 220 and a second tower or extension 230 spaced apart from each other. The blowing module 200 may include a tower base or connector 210 connecting the first tower 220 and the second tower 230 to the suction module 100. The tower base 210 may be above an upper side of the suction module 100 and may be provided at a lower side of the first and second tower 220 and 230.

An outer shape of the tower base 210 may be conical (or alternatively, cylindrical), and the tower base 210 may be provided on an upper surface of the suction module 100 to form an outer circumferential surface continuous with the suction module 100.

An upper surface 211 of the tower base 210, hereinafter called the tower base upper surface 211, may be concaved downward to form a recess or groove extending forward and backward. The first tower 220 may extend upward from a first side 211a (e.g., a left side) of the tower base upper surface 211, and the second tower 230 may extend upward from the a second side 211b (e.g., a right side) of the tower base upper surface 211.

The tower base 210 may distribute filtered air supplied from an inside of the suction module 100 and provide the distributed air to the first tower 220 and the second tower 230.

The tower base 210, the first tower 220, and the second tower 230 may be manufactured as separate components, or alternatively may be manufactured integrally. The tower base 210 and the first tower 220 may form a first continuous outer circumferential surface of the blower 1, and the tower base 210 and the second tower 230 may form a second continuous outer circumferential surface of the blower 1.

As an alternative to the embodiment shown in FIG. 1, the first tower 220 and the second tower 230 may be directly assembled to the suction module 100 without the tower base 210 or may be manufactured integrally with the suction module 100.

The first tower 220 and the second tower 230 may be spaced apart from each other, and a blowing space S may be formed between the first tower 220 and the second tower 230.

The blowing space S may be understood as a space between the first and second towers 220 and 230 which has open front, rear, and upper sides.

The outer shape of the blowing module 200 including the first tower 220, the second tower 230, and the blowing space S may be a conical (or alternatively, cylindrical) shape.

First and second discharge ports 222 and 232 respectively formed in the first tower 220 and the second tower 230 may discharge air toward the blowing space S.

The first tower 220 and the second tower 230 may be provided symmetrically with respect to the blowing space S so that an air flow is uniformly distributed in the blowing space S, facilitating control of a horizontal airflow and a rising airflow.

The first tower 220 may include a first tower case 221 forming an outer shape of the first tower 220, and the second tower 230 may include a second tower case 231 forming an outer shape of the second tower 230. The tower base 210, the first tower case 221, and the second tower case 231 may be referred to as an upper case which is provided above the lower case 120 and has first and second discharge ports 222 and 232 through which air is discharged. The lower case 120 and the upper case defined by the tower base 210, first tower case 221, and second tower 231 may collectively be referred to as a "case."

The first discharge port 222 may be formed in the first tower 220 to extend vertically, and the second discharge port 232 may be formed in the second tower 230 to extend vertically.

A flow direction of the air discharged from the first tower 220 and the second tower 230 may be formed in the front and rear direction.

A width of the blowing space S, which may be defined by a distance between the first tower 220 and the second tower 230, may be constant in the vertical direction. Alternatively, the width of the blowing space S may increase or decrease in the vertical direction.

Air flowing to a front of the blowing space S may be evenly distributed in the vertical direction by making the width of the blowing space S constant along the vertical direction.

If a width of an upper side of the blowing space S differs from the width of a lower side of the blowing space S, a flow speed at the wider side may be lower than at the narrower side, and a deviation of speed may occur in the vertical direction. When a deviation of air flow speed occurs in the vertical direction, an amount of clean air supplied may vary according to a vertical position from which the air is discharged.

Air discharged from each of the first discharge port 222 and the second discharge port 232 may be supplied to a user after being joined in the blowing space S.

The air discharged from the first discharge port 222 and the air discharged from the second discharge port 232 may not flow individually to the user, but may be supplied to the user after combining or mixing in the blowing space S.

An indirect airflow may be formed in the air around the blower 1 due to air discharged to the blowing space S such that the air around the blower 1 may also flow toward the blowing space S.

Since the discharged air of the first discharge port 222 and the discharged air of the second discharge port 232 are joined in the blowing space S, a straightness or steadiness of the joined discharged air may be improved. By joining the discharged air in the blowing space S, the air around the first tower 220 and the second tower 230 may also be induced to flow forward along an outer circumferential surface of the blowing module 200.

The first tower case 221 may include a first tower upper end 221a forming an upper surface of the first tower 220, a first tower front end 221b forming a front surface of the first tower 220, a first tower rear end 221c forming a rear surface of the first tower 220, a first outer wall 221d forming an outer circumferential surface of the first tower 220, and a first inner wall 221e forming an inner surface of the first tower 220 facing the blowing space S.

Similarly, the second tower case 231 may include a second tower upper end 231a forming an upper surface of the second tower 230, a second tower front end 231b forming a front surface of the second tower 230, a second tower rear end 231c forming a rear surface of the second tower 230, a second outer wall 231d forming an outer circumferential surface of the second tower 230, and a second inner wall 231e forming an inner surface of the second tower 230 facing the blowing space S.

The first outer wall 221d and the second outer wall 231d may be formed to curve convexly outward in ta radial direction so that outer circumferential surfaces of each of the first tower 220 and the second tower 230 are curved.

The first inner wall 221e and the second inner wall 231e may be formed to curve convex inward toward the blowing space S in the radial direction so inner circumferential surfaces of each of the first tower 220 and the second tower 230 are curved.

The first discharge port 222 may be formed in the first inner wall 221e and extend in the vertical direction. The first discharge port 222 may be opened inward in the radial direction. The second discharge port 232 may be formed in the second inner wall 231e and extend in the vertical direction. The second discharge port 232 may be opened inward in the radial direction.

The first discharge port 222 may be positioned closer to the first tower rear end 221c than the first tower front end 221b. The second discharge port 232 may be positioned closer to the second tower rear end 231c than the second tower front end 231b.

A first board slit 223 may be formed in the first inner wall 221e to extend vertically. A second board slit 233 may be formed in the second inner wall 231e to extend vertically. The first board slit 223 and the second board slit 233 may be formed to be opened inward in the radial direction. A first airflow converter 401 (FIG. 6) described later may pass through the first board slit 223 and a second airflow converter 402 (FIG. 6) described later may pass through the second board slit 233.

The first board slit 223 may be positioned closer to the first tower front end 221b than the first tower rear end 221c. The second board slit 233 may be positioned closer to the second tower front end 231b than the second tower rear end 231c. The first board slit 223 and the second board slit 233 may face each other.

Figure 2:
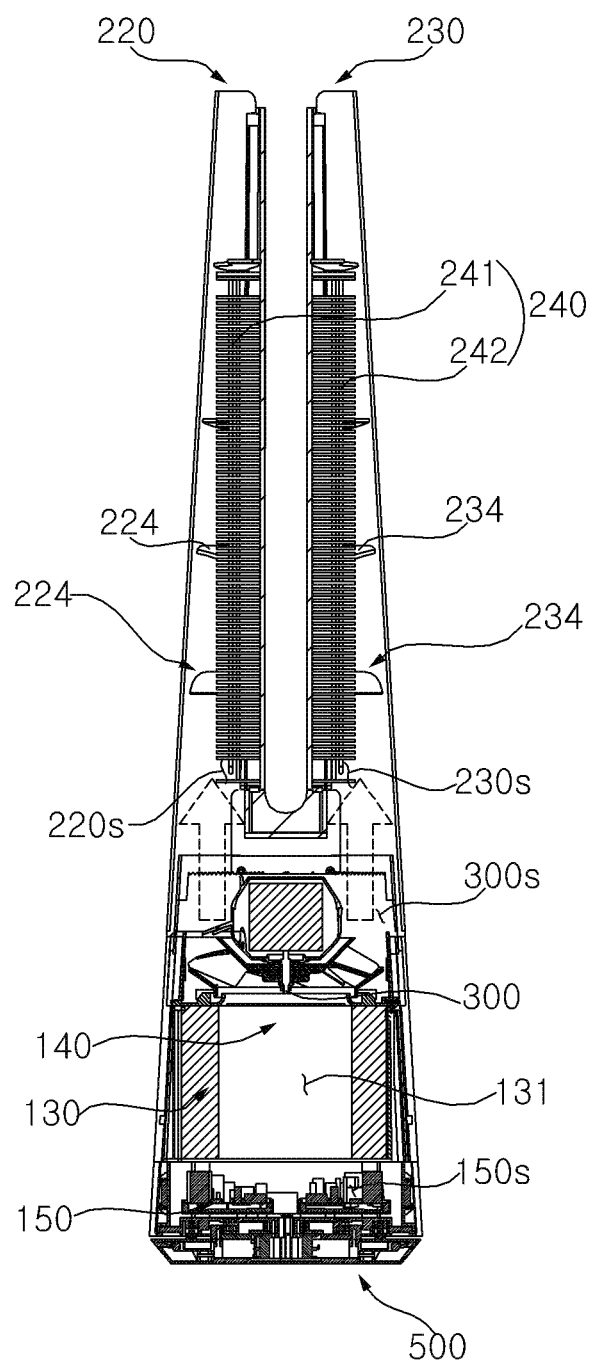
FIG. 2 is a vertical cross-sectional perspective view of the blower shown in FIG. 1 on a P-P' line.
Figure 3:
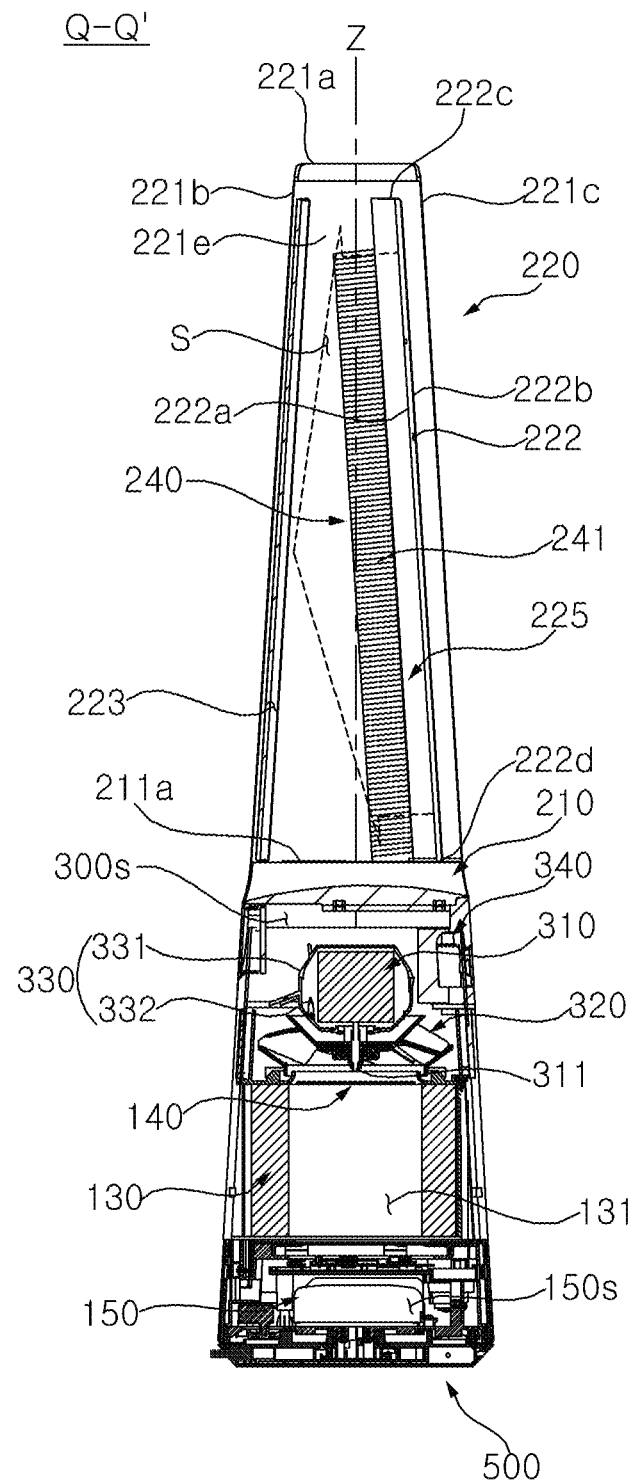
FIG. 3 is a vertical cross-sectional perspective view of the blower shown in FIG. 1 on a Q-Q' line.

Hereinafter, an internal structure of the blower 1 will be described with reference to FIGS. 2 and 3. FIG. 2 is a cross-sectional view of the blower 1 cut along the line P-P' shown in FIG. 1, and FIG. 3 is a cross-sectional view showing the blower 1 along the line Q-Q' shown in FIG. 1.

Referring to FIG. 2, a substrate assembly or controller 150 (e.g., printed circuit board or PCB assembly) to control an operation of a fan assembly 300 and a heater 240 may be provided in an upper side of the driving unit 500. A control space 150S in which the substrate assembly 150 is provided may be formed in the upper side of the driving unit 500.

The filter 130 may be provided above the control space 150S. The filter 130 may have a hollow cylindrical shape, and a cylindrical filter hole 131 or hollow opening may be formed inside the filter 130.

Air introduced through the suction port 121 may pass through the filter 130 and flow to the filter hole 131.

A suction grill 140 may be provided above the filter 130. Air flowing upward through the filter 130 may pass through the suction grill 140. The suction grill 140 may be provided between the fan assembly 300 and the filter 130. When the lower case 210 is removed and the filter 130 is separated from the blower 1, the suction grill 140 may prevent a user's hand from contacting the fan assembly 300.

The fan assembly 300 may be provided in the upper side of the filter 130 and may generate a suction force for air outside the blower 1.

By driving the fan assembly 300, ambient air outside the blower 1 may be suctioned through the suction port 121 and the filter hole 131 sequentially to flow to the first tower 220 and the second tower 230.

A pressurizing space 300s in which the fan assembly 300 is provided may be formed between the filter 130 and the blowing module 200.

A first distribution space 220s may be formed inside the first tower 220, and a second distribution space 230s may be formed inside the second tower 230. Air that passes through the pressurizing space 300s may flow upward through the first or second distribution spaces 220s or 230s. The tower base 210 may distribute the air that passed through the pressurizing space 300s into the first distribution space 220s and the second distribution space 230s. The tower base 210 may form a channel connecting the first and second towers 220 and 230 and the fan assembly 300.

The first distribution space 220s may be formed between the first outer wall 221d and the first inner wall 221e. The second distribution space 230s may be formed between the second outer wall 231d and the second inner wall 231e.

The first tower 220 may include a first flow guide or air guide 224 that guides a flow direction of the air inside the first distribution space 220s. A plurality of first flow guides 224 may be provided to be spaced apart from each other vertically.

The first flow guide 224 may be formed to protrude from the first tower rear end 221c toward the first tower front end 221b. The first flow guide 224 may be spaced apart from the first tower front end 221b in the front-rear direction. The first flow guide 224 may extend obliquely downward while progressing toward the front. An angle at which each of the plurality of first flow guides 224 is inclined downward may decrease as the first flow guide 224 progresses upward.

The second tower 230 may include a second flow guide or air guide 234 that guides a flow direction of the air inside the second distribution space 230s. A plurality of second flow guides 234 may be provided to be spaced apart from each other vertically.

The second flow guide 234 may be formed to protrude from the second tower rear end 231c toward the second tower front end 231b. The second flow guide 234 may be spaced apart from the second tower front end 231b in the front-rear direction. The second flow guide 234 may extend obliquely downward while progressing toward the front. An angle at which each of the plurality of second flow guides 234 is inclined downward may decrease as the second flow guide 234 progresses upward.

The first flow guide 224 may guide the air discharged from the fan assembly 300 to flow toward the first discharge port 222. The second flow guide 234 may guide the air discharged from the fan assembly 300 to flow toward the second discharge port 232.

Referring to FIG. 3, the fan assembly 300 may include a fan motor 310 which generates power, a motor housing 330 which receives the fan motor 310, a fan 320 which is rotated by receiving power from the fan motor 310, and a diffuser 340 which guides the flow direction of the air pressurized by the fan 320.

The fan motor 310 may be provided at an upper side of the fan 320 and may be connected to the fan 320 through a motor shaft 311 extending downward from the fan motor 310.

The motor housing 330 may include a first or upper motor housing 331 covering an upper portion of the fan motor 310 and a second or lower motor housing 332 covering a lower portion of the fan motor 310.

The first discharge port 222 may be provided in the upper side of the tower base 210. A first discharge port lower end 222d may join with or be provided in the upper side of the tower base upper surface 211.

The first discharge port 222 may be spaced apart from the lower side of the first tower upper end 221a. A first discharge port upper end 222c may be formed to be spaced apart from the lower side of the first tower upper end 221a.

The first discharge port 222 may obliquely extend in the vertical direction to be inclined. The first discharge port 222 may be inclined forward while progressing upward. The first discharge port 222 may obliquely extend rearward with respect to a vertical axis Z extending in the vertical direction.

A first discharge port front end 222a and a first discharge port rear end 222b may extend obliquely in the vertical direction, and may extend parallel to each other. The first discharge port front end 222a and the first discharge port rear end 222b may be inclined rearward with respect to the vertical axis Z extending in the vertical direction.

The first tower 220 may include a first discharge guide 225 to guide the air inside the first distribution space 220s to the first discharge port 222.

The first tower 220 may be symmetrical with the second tower 230 with respect to the blowing space S, and may have the same shape and structure as the second tower 230. The description of the first tower 220 described above may be identically applied to the second tower 230.

The blower 1 may include a heater 240 provided inside the upper case. A plurality of heaters 240 may be provided to correspond to the first discharge port 222 and the second discharge port 232, respectively. The heater 240 may include a first heater 241 provided in the first tower 220 and a second heater 242 provided in the second tower 230. The first heater 241 may be provided obliquely or at an angle in the vertical direction to correspond to or align with the first discharge port 222, and the second heater 242 may be provided obliquely or at an angle in the vertical direction to correspond to or align with the second discharge port 232.

The heater 240 may be supplied with power by a power supply device based on a switched mode power supply (SMPS) method. The heater 240 may receive power from an external power source and heat the air discharged to the blowing space S through the discharge port 222, 232.

Figure 4:
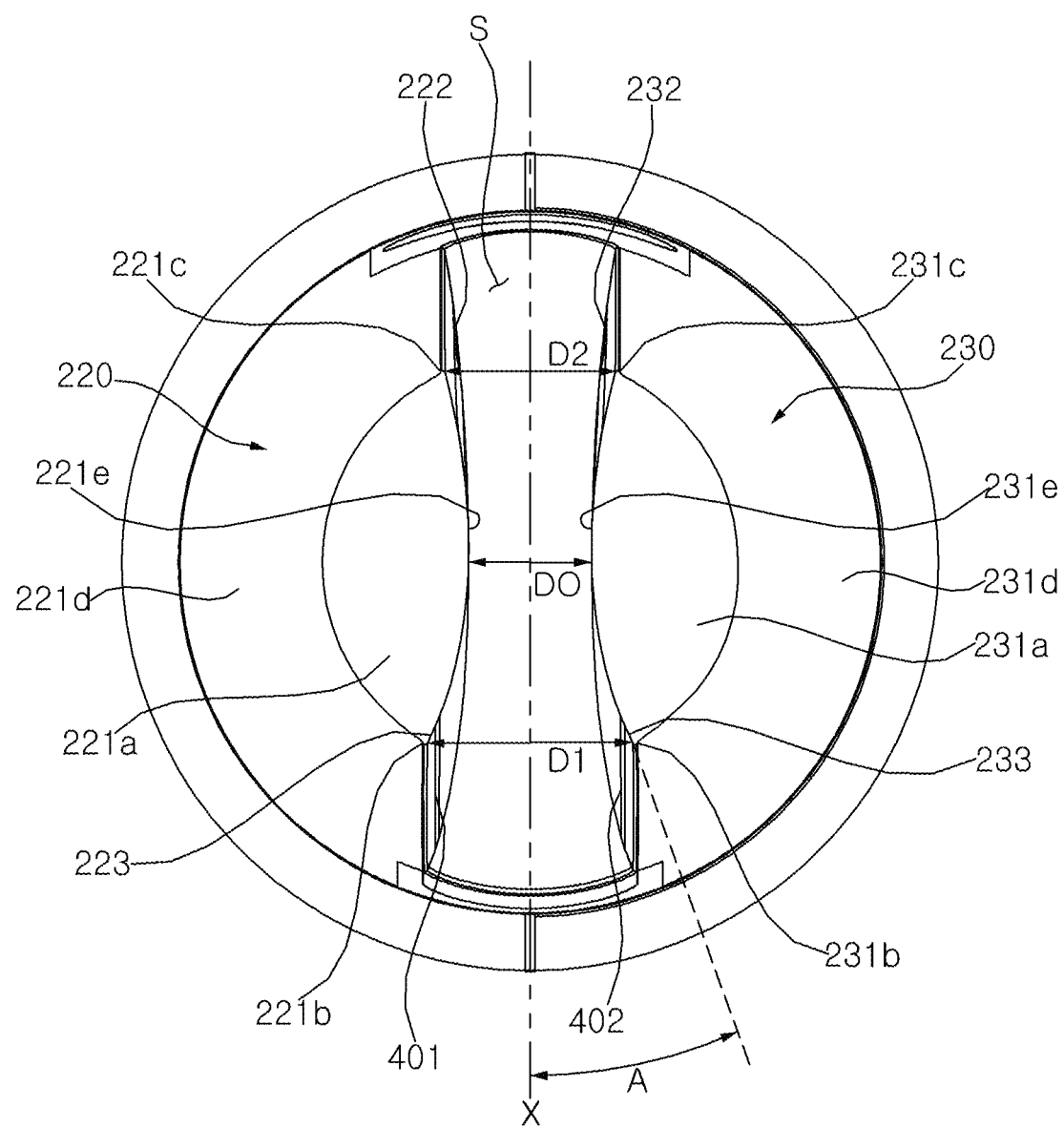
FIG. 4 is a top view of a blower according to an embodiment.
Figure 5:
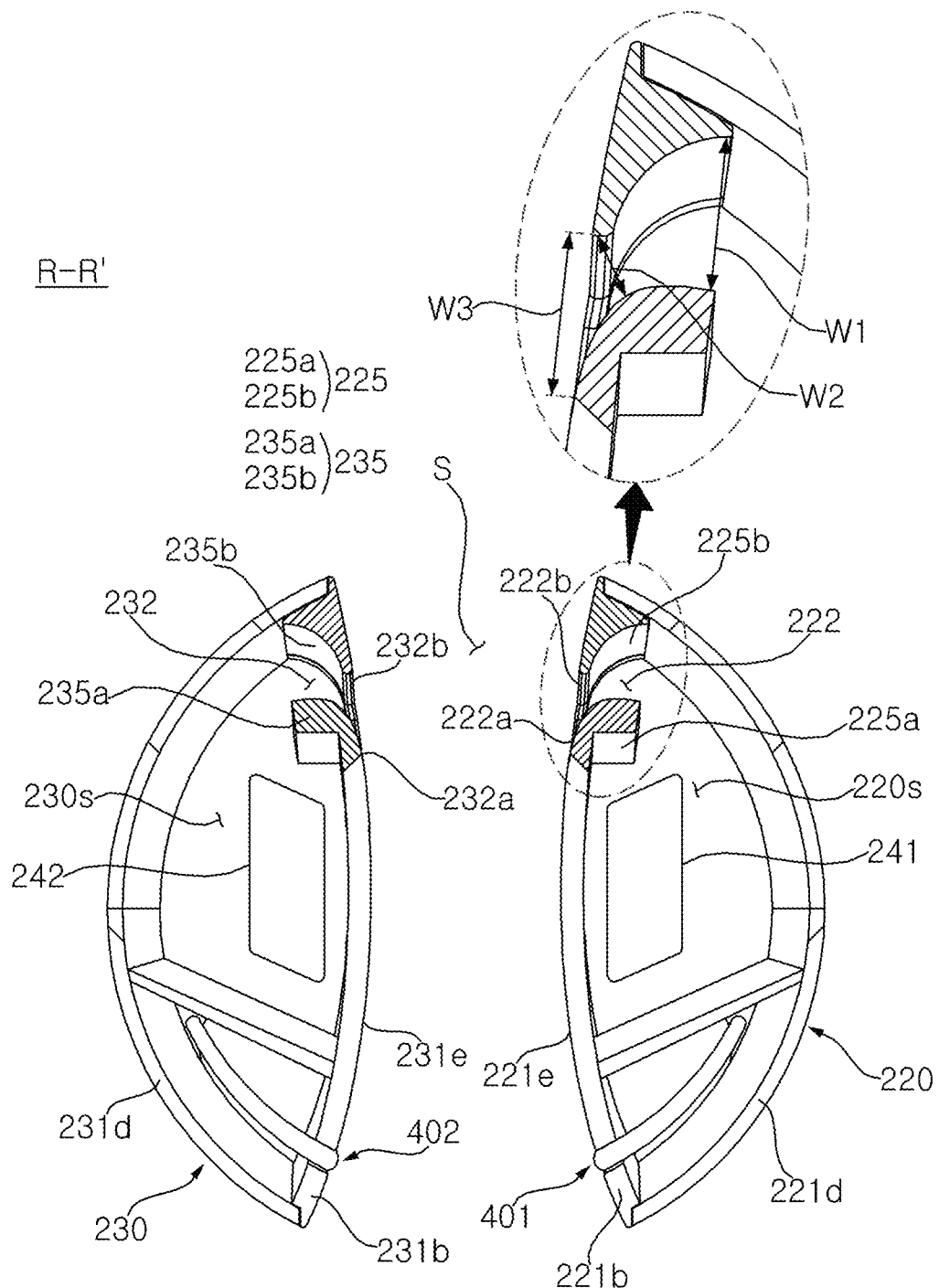
FIG. 5 is a horizontal cross-sectional perspective view of the blower shown in FIG. 1 on a R-R' line.

Hereinafter, an air discharge structure of the blower 1 for inducing a Coanda effect will be described with reference to FIGS. 4 and 5. FIG. 4 shows a form in which the blower 1 is viewed from the top to the bottom, and FIG. 5 shows a form in which the blower 1 is cut along the R-R' diagram shown in FIG. 1 and viewed upward.

Referring to FIG. 4, due to the convex curvatures of the first and second inner walls 221e and 231, a distance between the first inner wall 221e and the second inner wall 231e may decrease while approaching a closer of the blowing space S.

The first inner wall 221e and the second inner wall 231e may be formed to be convex toward the radial inner side, and a shortest or center distance DO may be formed between the vertices or centers of the first inner wall 221e and the second inner wall 231e. The shortest distance DO may be formed in the center of the blowing space S.

The first and second discharge ports 222 and 232 may be formed behind a position where the shortest distance DO is formed.

The first tower front end 221b and the second tower front end 231b may be spaced apart by a first or front distance D1. The first tower rear end 221c and the second tower rear end 231c may be spaced apart by a second or rear distance D2.

The first distance D1 and the second distance D2 may be the same, but embodiments disclosed herein are not limited. The first distance D1 may be greater than the shortest distance DO, and the second distance D2 may be greater than the shortest distance DO.

The distance between the first inner wall 221e and the second inner wall 231e may be decreased from the rear ends 221c, 231c to a position where the shortest distance DO is formed, and may be increased from a position where the shortest distance DO is formed to the front ends 221b, 231b.

The first tower front end 221b and the second tower front end 231b may be formed to be inclined or curved with respect to a front-rear axis X.

Tangent lines drawn at each of the first and second tower front ends 221b and 231b may have a certain inclination angle A with respect to the front-rear axis X.

Some of the air discharged forward through the blowing space S may flow with the inclination angle A with respect to the front-rear axis X.

Due to this curved structure of the first and second inner walls 221e and 231 e, the diffusion angle of the air discharged forward through the blowing space S may be increased.

A first airflow converter 401 described later may be brought into the first board slit 223 when air is discharged forward through the blowing space S.

A second airflow converter 402 described later may be brought into the second board slit 233 when air is discharged forward through the blowing space S.

Referring to FIG. 5, air discharged toward the blowing space S may be guided in a flow direction by the first discharge guide 225 and the second discharge guide 235.

The first discharge guide 225 may include a first inner guide 225a connected to the first inner wall 221e and a first outer guide 225b connected to the first outer wall 221d.

The first inner guide 225a may be manufactured integrally with the first inner wall 221e, or alternatively may be manufactured separately and later combined.

The first outer guide 225b may be manufactured integrally with the first outer wall 221d, or alternatively may be manufactured separately and later combined.

The first inner guide 225a may be formed to protrude from the first inner wall 221e toward the first distribution space 220s.

The first outer guide 225b may be formed to protrude from the first outer wall 221d toward the first distribution space 220s. The first outer guide 225b may be formed to be spaced apart from the first inner guide 225a and may form the first discharge port 222 between the first inner guide 225a and the first outer guide 225b.

A radius of curvature of the first inner guide 225a may be less than a radius of curvature of the first outer guide 225b.

The air in the first distribution space 220s may flow between the first inner guide 225a and the first outer guide 225b, and may flow into the blowing space S through the first discharge port 222.

The second discharge guide 235 may include a second inner guide 235a connected to the second inner wall 231e and a second outer guide 235b connected to the second outer wall 231d.

The second inner guide 235a may be manufactured integrally with the second inner wall 231e, or alternatively may be manufactured separately and later combined.

The second outer guide 235b may be manufactured integrally with the second outer wall 231d, or alternatively may be manufactured separately and later combined.

The second inner guide 235a may be formed to protrude from the second inner wall 231e toward the second distribution space 230s.

The second outer guide 235b may be formed to protrude from the second outer wall 231d toward the second distribution space 230s. The second outer guide 235b may be formed to be spaced apart from the second inner guide 235a and may form a second discharge port 232 between the second inner guide 235a and the second outer guide 235b.

A radius of curvature of the second inner guide 235a may be smaller than a radius of curvature of the second outer guide 235b.

The air in the second distribution space 230s may flow between the second inner guide 235a and the second outer guide 235b and flow into the blowing space S through the second discharge port 232.

A width of the first discharge port 222 may be formed to gradually decrease and then increase as it progresses from an inlet of the first discharge guide 225, which may be an inlet 222i of the first discharge port 222, toward an outlet of the first discharge guide 226, which may be an outlet 222o of the first discharge port 222.

An inlet width w1 of the inlet 222i may be larger than an outlet width w3 of the outlet 222o.

The inlet width w1 may be defined as a distance between an outer end of the first inner guide 225a and an outer end of the first outer guide 225b. The outlet width w3 may be defined as a distance between the first discharge port front end 222a, which is an inner end of the first inner guide 225a, and the first discharge port rear end 222b, which is an inner end of the first outer guide 225b.

The inlet width w1 and the outlet width w3 may each be larger than a shortest or inner width w2 of the first discharge port 222.

The shortest width w2 may be defined as the shortest distance between the first discharge port rear end 222b and the first inner guide 225a.

The width of the first discharge port 222 may gradually decrease from the inlet of the first discharge guide 225 to a position where the shortest width w2 is formed, and may gradually increase from a position where the shortest width w2 is formed to the outlet of the first discharge guide 225.

Similar to the first discharge guide 225, the second discharge guide 235 may have a second discharge port front end 232a and a second discharge port rear end 232b. The second discharge guide 235 may have a same width distribution or configuration as the first discharge guide 225.

The air discharged to the blowing space S through the first discharge port 222 may flow forward along an inner surface of the first inner wall 221e due to the Coanda effect. The air discharged to the blowing space S through the second discharge port 232 may flow forward along an inner surface of the second inner wall 231e due to the Coanda effect.

Figure 6:
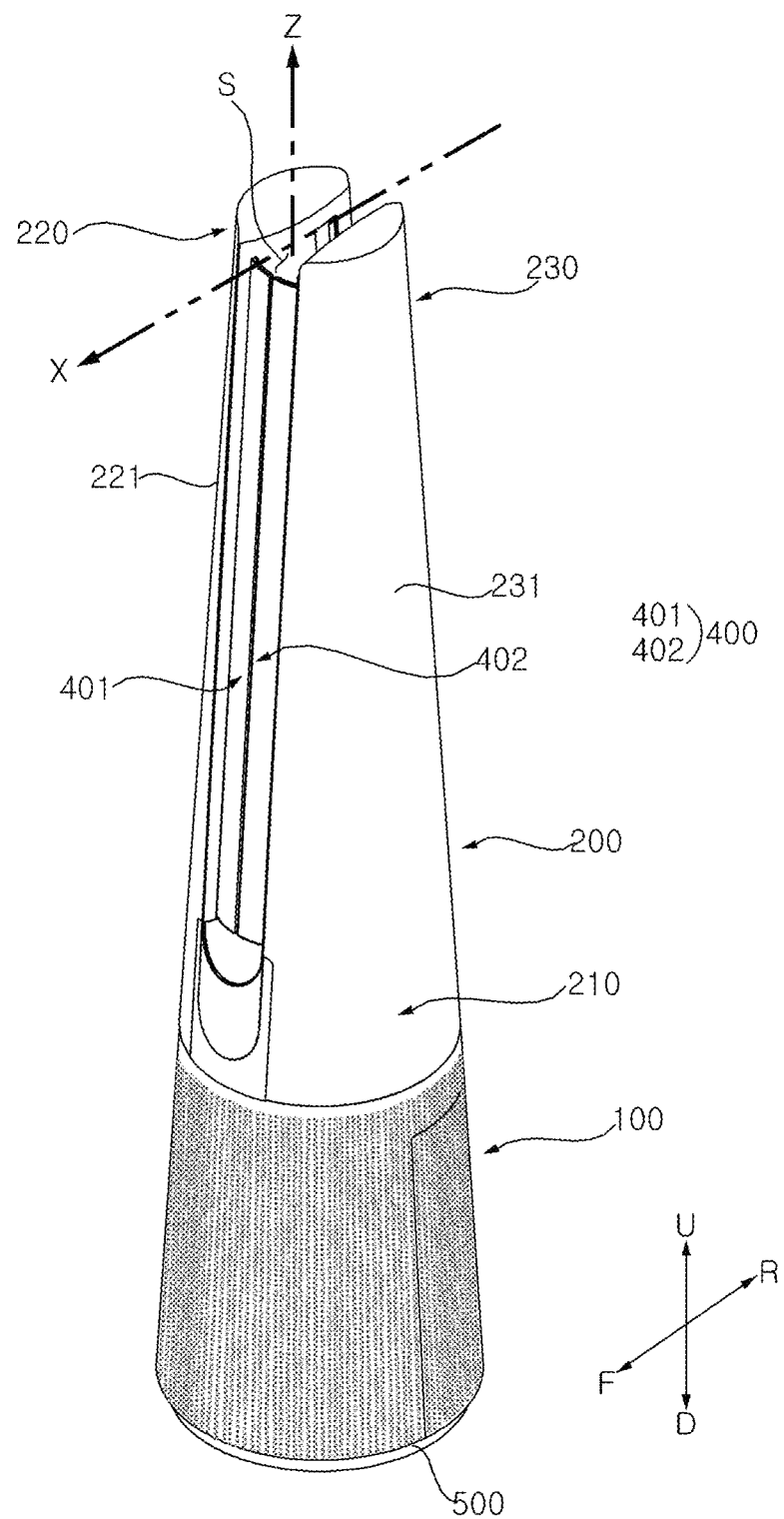
FIG. 6 is an exemplary view of an airflow converter according to an embodiment.
Figure 7:
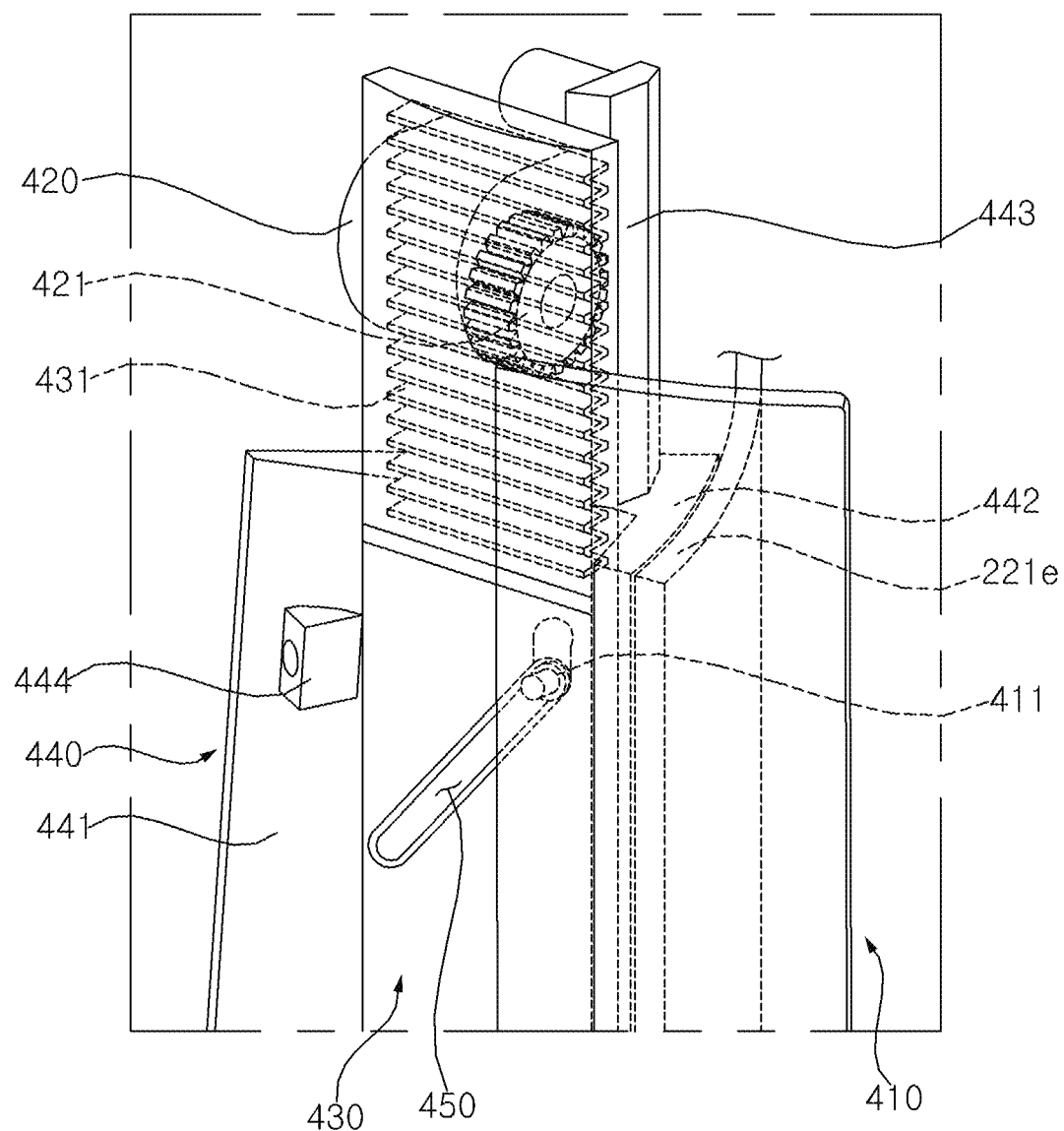
FIG. 7 is a structural diagram of an airflow converter according to an embodiment.

Hereinafter, a wind direction change by an air flow converter 400 will be described with reference to FIGS. 6 and 7. FIG. 6 is a diagram illustrating a form in which the airflow converter 400 protrudes into the blowing space S so that the blower 1 forms an upward airflow, and FIG. 7 is a diagram illustrating the operating principle of the airflow converter 400.

Referring to FIG. 6, the airflow converter 400 may protrude toward the blowing space S and may convert the flow of air discharged forward through the blowing space S into a rising wind.

The airflow converter 400 may include a first airflow converter 401 provided at the first tower case 221 and a second airflow converter 402 provided at the second tower case 231.

The first airflow converter 401 and the second airflow converter 402 be coupled to (e.g., inserted in) and protrude from each of the first tower 220 and the second tower 230 toward the blowing space S to block a front of the blowing space S.

When the first airflow converter 401 and the second airflow converter 402 protrude to block the front of the blowing space S, the air discharged through the first discharge port 222 and the second discharge port 232 may flow upward in the Z direction.

The first and second airflow converters 401 and 402 may be configured be inserted or pulled to an inside of the first and second towers 220 and 230, respectively, via the first and second board slits 223 and 233. When the first airflow converter 401 and the second airflow converter 402 are respectively brought or pulled into the first tower 220 and the second tower 230 to open the front of the blowing space S, the air discharged through the first discharge port 222 and the second discharge port 232 may flow forward X through the blowing space S. As an alternative, the first and second airflow converts 401 and 402 may be configured to be removable from the first and second board slits 223 and 233 (e.g., by lifting or pulling). As another alternative, the first and second air flow converters 401 and 402 may be removably coupled to the inner walls 221e and 231e of the first and second tower cases 221 and 231.

Referring to FIG. 7, the first and second airflow converters 401 and 402 may each include a board 410 protruding toward the blowing space S, a motor 420 providing driving force to the board 410 to move the board 410, a board guide 430 to guide a moving direction of the board 410, and a cover 440 to support the motor 410 and the board guide 430.

Hereinafter, the first airflow converter 401 will be described as an example, but the description of the first airflow converter 401 described below may be identically applied to the second airflow converter 402.

The board 410 may be brought into the first board slit 223 as shown in FIGS. 4 and 5. When the motor 420 is driven, the board 410 may protrude into the blowing space S through the first board slit 223. The board 410 may be curved to have an arc shape. When the motor 420 is driven, the board 410 may be moved in a curved or circumferential direction to protrude into the blowing space S.

The motor 420 may be connected to a pinion gear 421 to rotate the pinion gear 421. The motor 420 may rotate the pinion gear 421 clockwise or counterclockwise.

The board guide 430 may have a plate shape extending vertically. The board guide 430 may include a guide slit 450 which is inclined upward in a rightward direction (or alternatively, leftward direction), based on FIG. 7. The board guide may include a rack 431 formed to protrude toward and engage with the pinion gear 421.

When the motor 420 is driven and the pinion gear 421 is rotated, the rack 431 engaged with the pinion gear 421 may be moved vertically.

A guide protrusion or knob 411 may be formed in the board 410 to protrude toward the board guide 430. The guide protrusion 411 may be inserted into the guide slit 450.

When the board guide 430 is moved vertically according to the vertical movement of the rack 431, the guide protrusion 411 may be moved by an edge of the board guide 430 defining the guide slit 450 pressing against the guide protrusion 411. According to the vertical movement of the board guide 430, the guide protrusion 411 may be moved diagonally within the guide slit 450.

When the rack 431 is moved upward, the guide protrusion 411 may be moved along the guide slit 450 to be positioned in a lowermost end (also a leftmost end in FIG. 7) of the guide slit 450. When the guide protrusion 411 is positioned in the lowermost end of the guide slit 450, the board 410 may be completely concealed within the first tower 220 as shown in FIGS. 4 and 5. When the rack 431 is moved upward, the guide slit 450 is also moved upward. Accordingly, the guide protrusion 411 may be moved in the circumferential direction on a same horizontal plane along the guide slit 450.

When the rack 431 is moved downward, the guide protrusion 411 may be moved along the guide slit 450 to be positioned in an uppermost end (also a rightmost end in FIG. 7) of the guide slit 450. When the guide protrusion 411 is positioned in the uppermost end of the guide slit 450, the board 410 may protrude from the first tower 220 toward the blowing space S as shown in FIG. 6. When the rack 431 is moved downward, the guide slit 450 is also moved downward. Accordingly, the guide protrusion 411 may be moved in the circumferential direction on the same horizontal plane along the guide slit 450.

The cover 440 may include a first cover 441 provided outside the board guide 430, a second cover 442 provided inside the board guide 430 and contacting the first inner surface 221e, a motor support plate 443 extended upward from the first cover 441 and connected to the motor 420, and a stopper 444 to limit the vertical movement of the board guide 430.

The first cover 441 may cover an outside of the board guide 430, and the second cover 442 may cover an inside of the board guide 430. The first cover 441 may separate a space in which the board guide 430 is provided from the first distribution space 220s. The second cover 442 may prevent the board guide 430 from contacting the first inner wall 221e.

The motor support plate 443 may extend upward from the first cover 441 to support the load of the motor 420.

The stopper 444 may be formed to protrude toward the board guide 430 from the first cover 441. A locking protrusion may be formed on a surface of the board guide 430, and the locking protrusion may be configured to be caught by the stopper 444 according to the vertical movement of the board guide 430. When the board guide 430 is moved vertically, the locking protrusion may be caught by the stopper 444 so that a vertical movement of the board guide 430 may be restricted.

Figure 8:
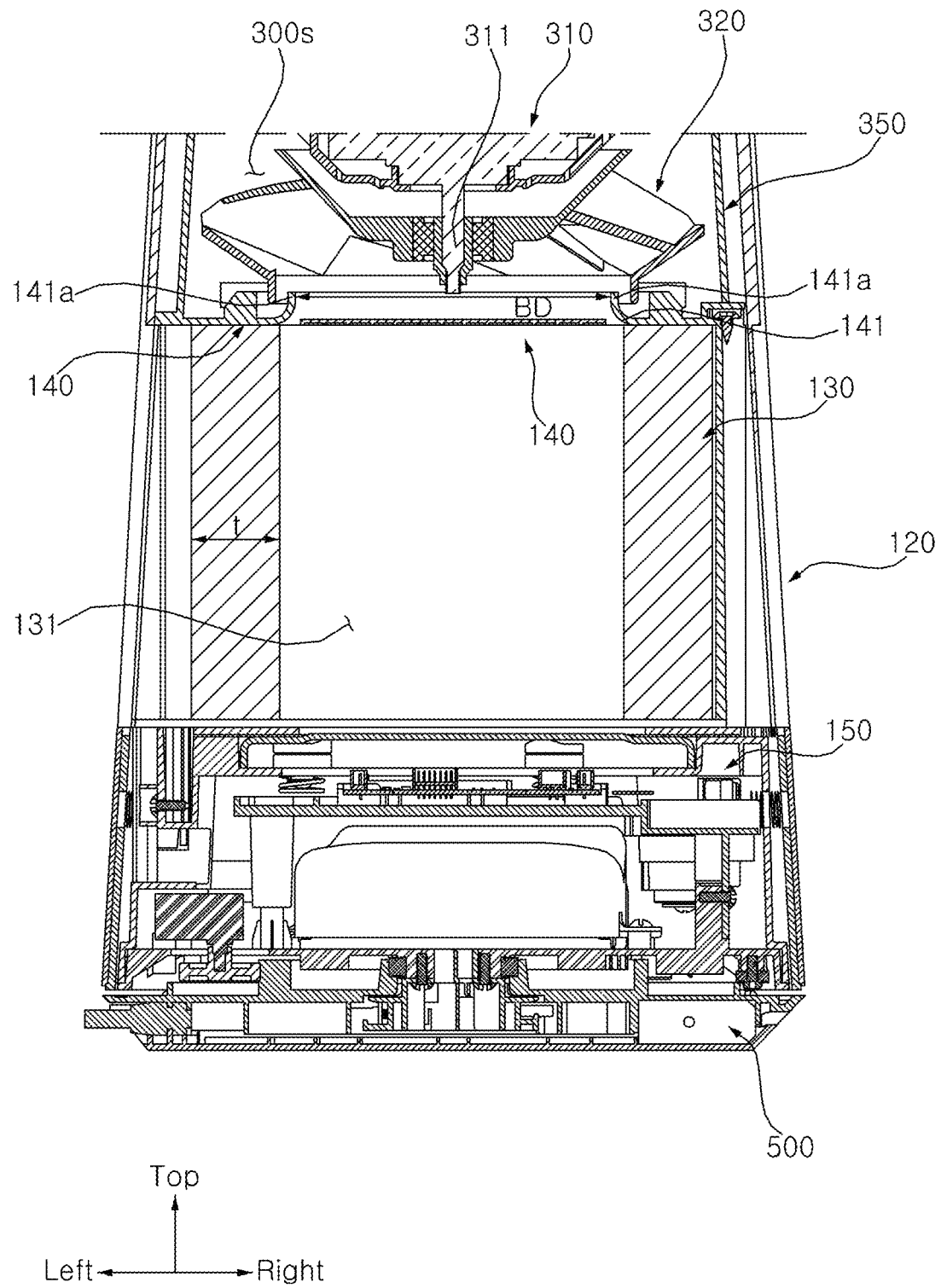
FIG. 8 is a longitudinal sectional view of a lower portion of a blower according to an embodiment.
Figure 9:
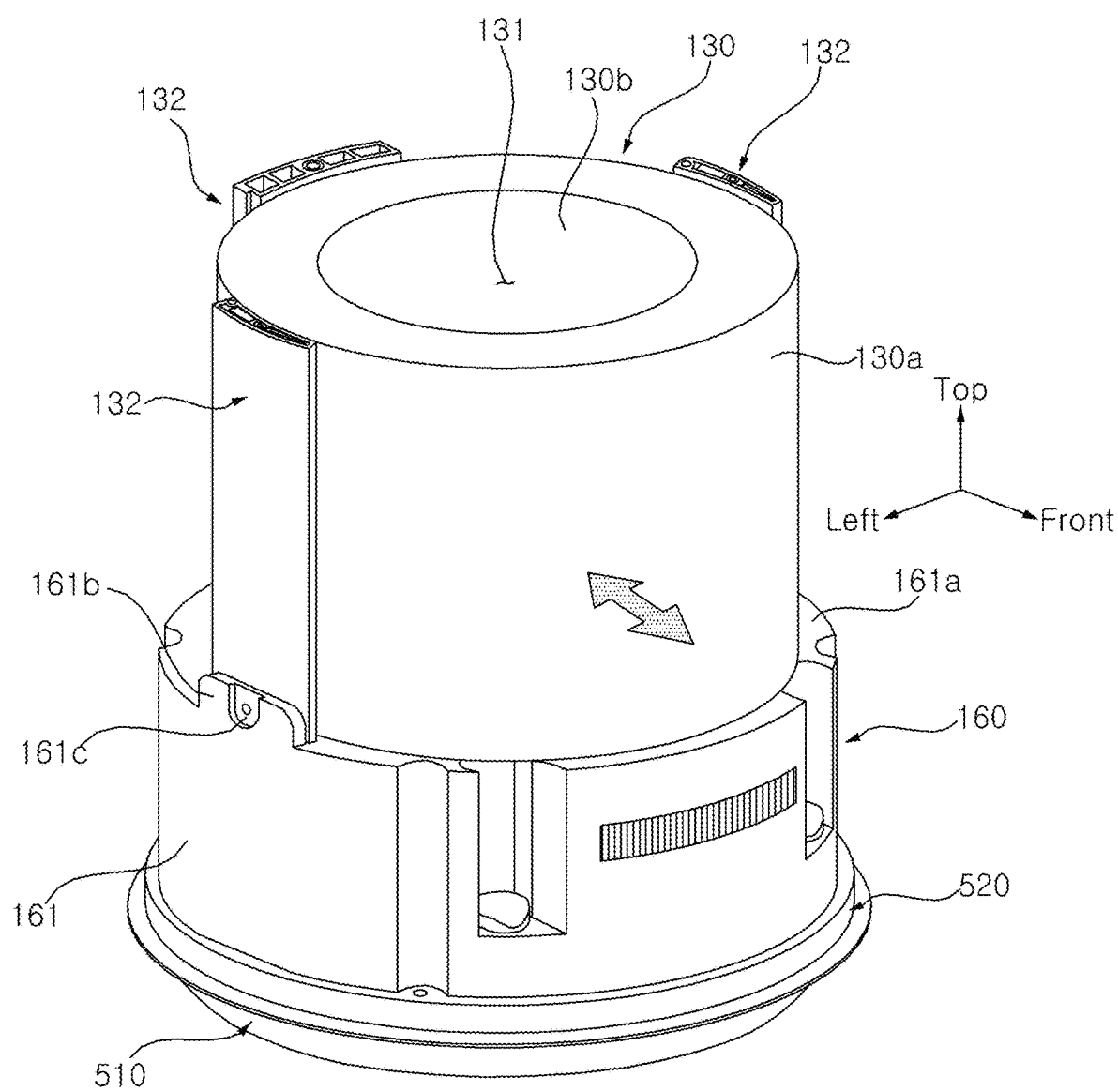
FIG. 9 is a view of a lower structure of a blower according to an embodiment.

Hereinafter, the internal structure of the suction module 100 will be described with reference to FIGS. 8 and 9. Referring to FIGS. 8-9, the fan assembly 300 may include a fan housing 350 in which the fan 320 is received.

The fan housing 350 may include a bell mouth or air guide 141 that guides the air passing through the filter 130 to the fan 320. The bell mouth 141 may be provided above the filter 130, and the suction grill 140 may be provided between the filter 130 and the bell mouth 141.

The bell mouth 141 may have a ring shape having a predetermined inner diameter BD, and an inside may be opened in a vertical direction. The inner diameter BD may be understood as a diameter of an inner circumferential surface 141a of the bell mouth 141, and an air flow path toward the fan 320 may be formed inside the bell mouth 141.

The fan 320 connected to the motor shaft 311 may generate a suction force to suction the air in the filter hole 131 by rotation, and the air in the filter hole 131 may flow into the fan housing 350 through the suction grill 140 and the bell mouth 141. The filter 130 may have a cylindrical shape in which the filter hole 131 is formed, and the air introduced into the lower case 120 through the suction hole 121 may flow into the filter hole 131 by passing between the outer circumferential 130a and inner circumferential surface 130b of the filter 130. The air introduced into the lower case 120 may flow into the filter hole 131 via the filter 130 while foreign substances are removed by a pre-filter, hepa filter, or deodorizing filter provided between the outer circumferential surface 130a and the inner circumferential surface 130b of the filter 130.

The filter 130 may be supported by a filter frame 132 that limits movement of the filter 130 in a radially outward direction. The filter frame 132 may extend in the vertical direction and may contact the outer circumferential surface 130a of the filter 130. A plurality of filter frames 132 (e.g., three) may be provided to be spaced apart in a circumferential direction. The filter 130 may enter or exit through an area in which the filter frame 132 is not provided. The lower case 120 may be provided to be detachably attached to the driving unit 500, and the user may remove the lower case 120 and then pull out the filter 130 to clean the filter 130.

Figure 21:
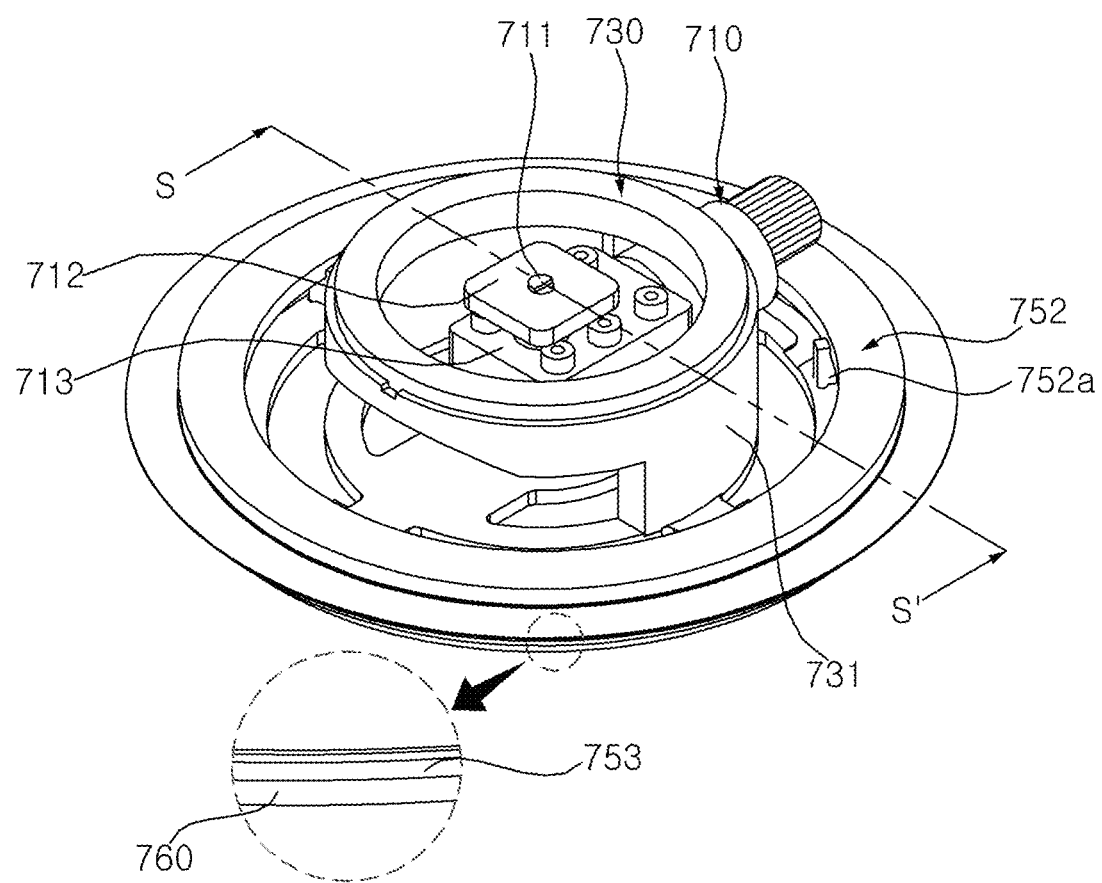
FIG. 21 is a perspective view of a part of a driving unit according to a third embodiment.

The filter frame 132 may be connected to the substrate housing 160 provided under the filter 130. The substrate housing 160 may be in contact with the lower surface of the filter 130 to support the filter 130. The substrate housing 160 may include a housing outer wall 161 extending in the circumferential direction and supported by driving unit 500, 600 (FIG. 16), and/or 700 (FIG. 21).

The housing outer wall 161 may include an upper surface of the outer housing wall 161a extending in the circumferential direction, a frame connection portion or tab 161b protruding upward from the upper surface of the housing outer wall 161a, and a frame fastening hole 161c formed in the frame connection portion 161b. The filter frame 132 may be connected to the housing outer wall 161 through a predetermined fastening member (e.g., a bolt or screw) penetrating the frame fastening hole 161c and may be fixed to the substrate housing 160.

The driving unit 500, 600, 700 to rotate the blower 1 may be provided under the substrate housing 160. The driving unit 500, 600, 700 may include a base 510, 610 (FIG. 16), and 760 (FIG. 21) in contact with the ground and a rotating plate 520 and 620 (FIG. 16) that is rotatably provided on the upper side of the base 510, 610, and 760.

The substrate housing 160 may be provided above the rotating plate 520 and 620, and the rotating plate 520 and 620 may be rotated while supporting the load of the substrate housing 160 and all the structures provided on an upper side of the substrate housing 160.

Figure 10:
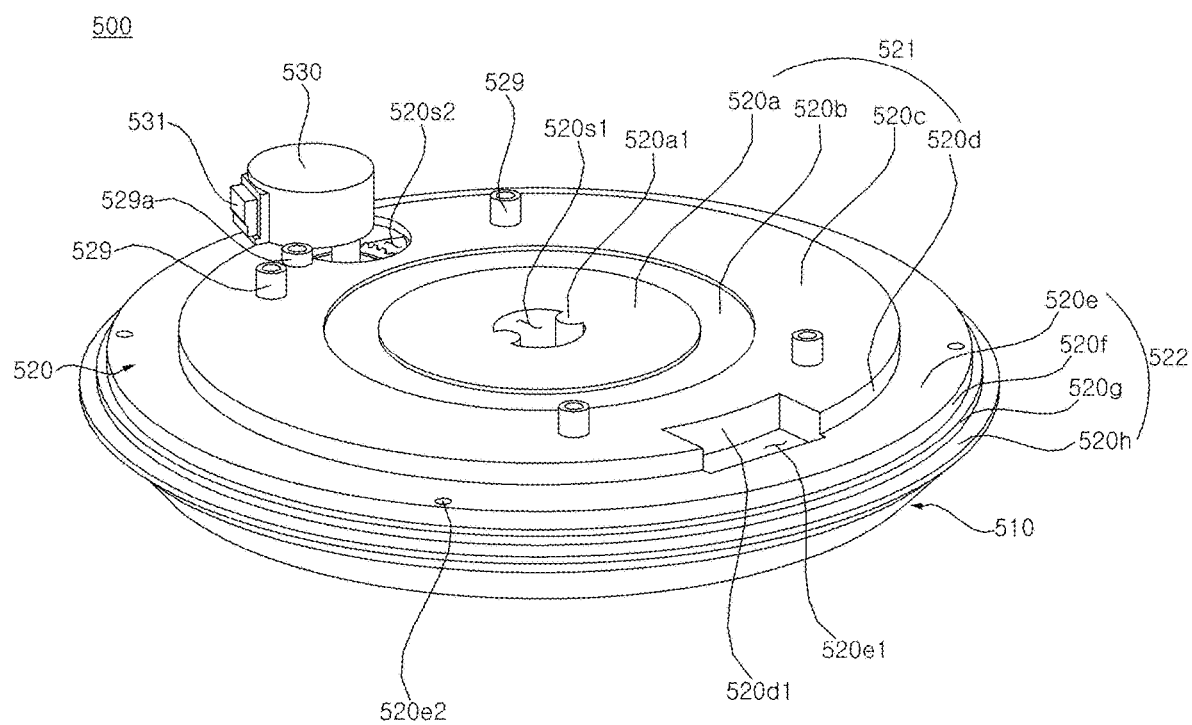
FIG. 10 is a perspective view of a driving unit according to an embodiment.

Hereinafter, an external structure of the driving unit 500 according to a first embodiment will be described with reference to FIG. 10. Referring to FIG. 10, the driving unit 500 may include a base 510, a rotating plate 520 connected to the lower case 120 and rotatably provided on an upper side of the base 510, and a motor 530 that generates power to rotate the rotating plate 520.

The base 510 may be in contact with the ground and may be fixedly provided on the ground, and may have a shape of a bowl. The rotating plate 520 may be provided so as to be rotatable above the base 510 and supported by the base 510. The base 510, when the rotating plate 520 is rotated, may support the normal stress and shear stress generated by all the structures provided on an upper side of the base 510 including the rotating plate 520.

The rotating plate 520 may be provided to cover an upper portion of the base 510 and may include a first seating portion 521 on which the substrate housing 160 is seated and a second seating portion 522 on which the lower case 120 is seated. The first seating portion 521 and the second seating portion 522 may be integrally formed, and the first seating portion 521 and the second seating portion 522 can be distinguished from each other by a first stepped portion 520$d$ formed between the first seating portion 521 and the second seating portion 522. The first seating portion 521 may be formed to protrude upwardly than the second seating portion 522, and the first stepped portion 520$d$ may be formed to have a height in the vertical direction and extend in the circumferential direction.

The first seating portion 521 may include a central portion 520$a$ in which a shaft through hole 520$s1$ is formed, a first rim 520$b$ formed to surround the central portion 520$a$, a second rim 520$c$ formed to surround the first rim 520$b$, and the first stepped portion 520$d$ protruding downward from the second rim 520$c$. An overall outer shape of the central portion 520$a$ may be a disk shape, and a shaft through hole 520$s1$ opened in the vertical direction may be formed in the central portion 520$a$. The shaft through hole 520$s1$ may be a space into which a shaft body 570 (FIG. 11) described later is inserted. A pair of crests or curved portions 520$a1$ formed to face each other may be formed in the shaft through hole 520$s1$. The crest 520$a1$ may be a region formed by partially submerging the central portion 520$a$ into the shaft through hole 520$s1$, and the shaft through hole 520$s1$ may have a portion protruding radially inward by the crest 520$a1$.

An overall outer shape of the first rim 520$b$ may be annular, and the first rim 520$b$ may be connected to the central portion 520$a$ along an outer circumference of the central portion 520$a$. An upper surface of the first rim 520$b$ may be formed to be bent or recessed downward from an upper surface of the central portion 520$a$.

An overall outer shape of the second rim 520$c$ may be annular, and the second rim 520$c$ may be connected to the first rim 520$b$ along an outer circumference of the first rim 520$b$. An upper surface of the second rim 520$c$ may be formed to be bent or stepped upward from an upper surface of the first rim 520$b$. The first rim 520$b$ may be understood as a region recessed downward between the central portion 520$a$ and the second rim 520$c$.

An overall outer shape of the first stepped portion 520$d$ may be cylindrical, and a shape of the cross-section may be annular. The first stepped portion 520$d$ may be formed to protrude or be bent downward along an outer circumference of the second rim 520$c$, and may extend in a circumferential direction. The first seating portion 521 may be vertically spaced apart from the second seating portion 522 by the first stepped portion 520$d$.

The second seating portion 522 may include a third rim 520$e$ connected to the first stepped portion 520$d$, a second step portion 520$f$ protruding downward from the third rim 520$e$, a bent portion 520$g$ connected to the second stepped portion 520$f$, and an edge 520$h$ connected to the bent portion 520$g$. An overall external shape of the third rim 520$e$ may be annular and may be connected to the first stepped portion 520$d$ along an outer circumference of the first stepped portion 520$d$. The third rim 520$e$ may protrude in a radially outward direction from a lower end of the first stepped portion 520$d$ and may extend in a circumferential direction. The third rim 520$e$ may be located below the second rim 520$c$.

The second stepped portion 520$f$ may be formed to protrude downward from an outer circumference of the third rim 520$e$ and may extend in the circumferential direction. The third rim 520$e$ may be vertically spaced apart from the bent portion 520$g$ by the second stepped portion 520$f$.

The first stepped portion 520$d$ and the second stepped portion 520$f$ may be referred to as "stepped portions" formed to be bent from an upper surface of the rotating plate 520. The bent portion 520$g$ may be formed to protrude in a radially outward direction from an outer circumference of the second stepped portion 520$f$ and may extend in a circumferential direction. The bent portion 520$g$ may be bent downward at least once in a radially outward direction. The bent portion 520$g$ may be defined as an area between the second stepped portion 520$f$ and the edge 520$h$.

The edge 520$h$ may form the outermost side of the rotating plate 520. The edge 520$h$ may be formed to protrude in a radially outward direction from an outer circumference of the bent portion 520$g$ and may extend in a circumferential direction. A lower surface of the edge 520$h$ may be in contact with an upper surface of the base 510 and supported by the base 510.

An upper boss 529 may be formed to protrude upward from an upper surface of the rotating plate 520. A plurality of upper bosses 529 may be formed to be spaced apart in the circumferential direction and may protrude upward from an upper surface of the second rim 520$c$. The upper boss 529 may be connected to the substrate housing 160 to fix the substrate housing 160 to the rotating plate 520. The substrate housing 160 may be fixed to the rotating plate 520 through a predetermined fastening member (e.g., bolt) penetrating the upper boss 529 and is integrally rotated with the rotating plate 520 by the rotation of the rotating plate 520.

The motor 530 may be provided above the rotating plate 520. At the rotating plate 520, a motor insertion groove 520$s2$ opened in the vertical direction may be formed. The motor 530 may be supported by the rotating plate 520 by a part of a lower area of the motor 530 being inserted into the motor insertion groove 520$s2$. The motor insertion groove 520$s2$ may be formed at the second rim 520$c$ and may be formed between the plurality of upper bosses 529. The motor 530 may be rotated integrally with the rotating plate 520 while being inserted into the motor insertion groove 520$s2$. As the motor 530 is provided above the rotating plate 520 and rotated together, the vertical height of the driving unit 500 can be reduced so that the driving unit 500 can be manufactured more compactly.

An overall external shape of the motor 530 may be cylindrical. The motor 530 may include a wire connection part or connector 531 formed to protrude to an outside of the motor 530 and electrically connected to the wire 590. When the motor 530 is integrally rotated with rotating plate 520, to prevent the wire connection part 531 from being removed, any one of the plurality of upper bosses 529 may be a stopper boss 529a. The stopper boss 529a may have the same shape as the upper boss 529, and can be defined as an upper boss positioned adjacent to the wire connection part 531. The stopper boss 529a may be located within a radius of rotation of the wire connection part 531, and the wire connection part 531 may be caught by the stopper boss 529a while being rotated.

A case fastening hole 520e2 may be formed at the rotating plate 520. A predetermined fastening member (e.g., bolt) connected to the lower case 120 may penetrate the case fastening hole 520e2. The case fastening hole 520e2 may be formed to be vertically opened in the third rim 520e. A plurality of case fastening holes 520e2 may be formed to be spaced apart in a circumferential direction. The case fastening hole 520e2 may be formed at the lower boss 528 (FIG. 13) to be described later, and a predetermined fastening member may pass through the case fastening hole 520e2 to connect the lower case 120 to the rotating plate 520. The lower case 120 may be connected to the rotating plate 520 and may be rotated integrally with the rotating plate 520 by the rotation of the rotating plate 520.

The first stepped portion 520d may extend in a circumferential direction, and at least a portion may be formed to be bent in a radially inward direction. The first stepped portion 520d may be formed to be bent in a radially inward direction to form a valley 520d1. The valley 520d1 may form a groove 520e1 that is vertically opened between the first stepped portion 520d and the third rim 520e. At the lower case 210, a protrusion to facilitate connection with the rotating plate 520 may be formed, and the protrusion may be inserted into the groove 520e1 so that the lower case 120 may be fixed to the rotating plate 520. However, the lower case 120 may be connected to the rotating plate 520 through the case fastening hole 520e2, and the valley 520d1 and the groove 520e1 may alternatively be omitted.

The first stepped portion 520d and the second stepped portion 520f may provide a height distribution of the rotating plate 520 extending in the radial direction, so that the first stepped portion 520d and the second stepped portion 520f may provide a space for a bearing 580 (FIG. 13) to be described later to be placed inside the rotating plate 520.

Figure 11:
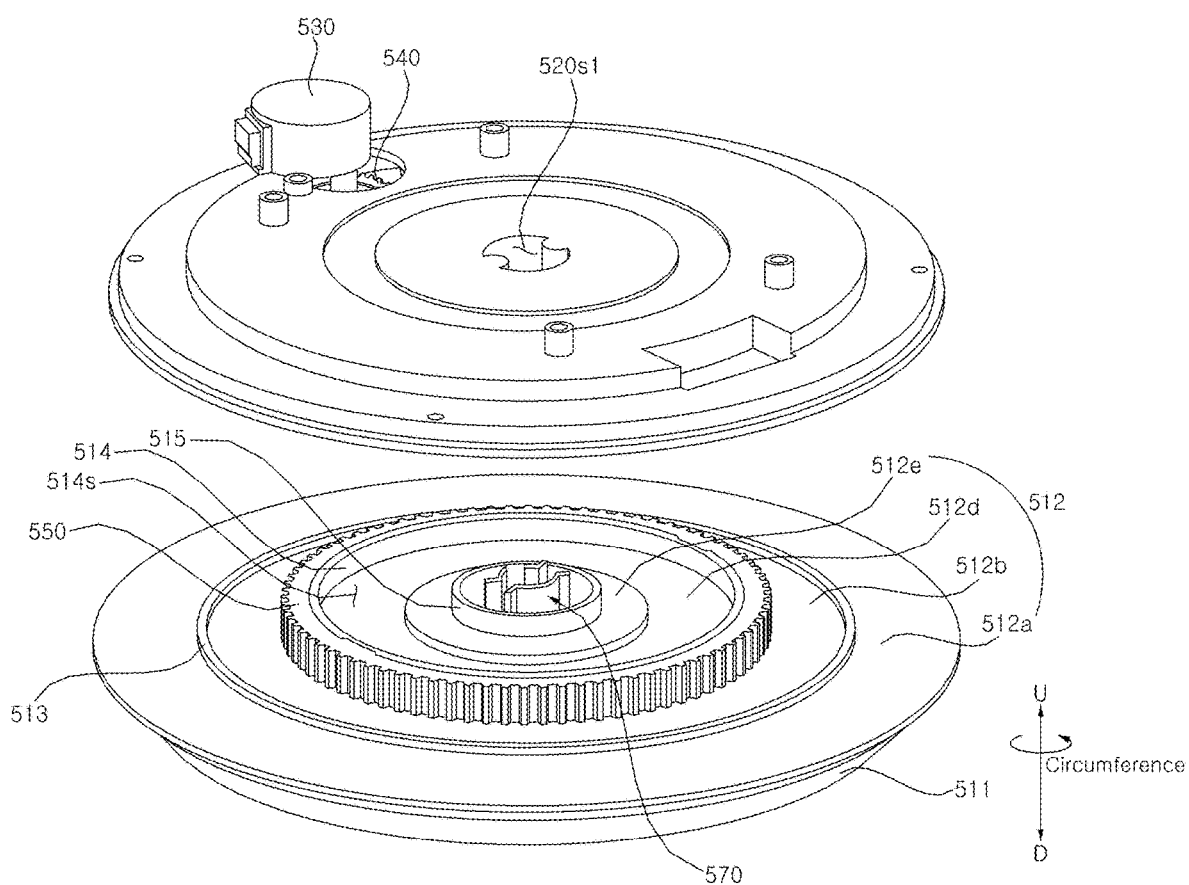
FIG. 11 is an exploded perspective view of a driving unit according to an embodiment.

Hereinafter, a structure of the base 510 according to the first embodiment will be described with reference to FIG. 11. Referring to FIG. 11, the base 510 includes a stem or side wall 511 that forms a space at an inner side and is in contact with a ground, table, or floor surface, and a roof or upper portion 512 covering an inner space of the stem 511 and provided on an upper side of the stem 511. The roof 512 may alternatively be referred to as a cap.

An overall appearance of the stem 511 may be a bowl type, and the space may be formed inside. An overall external shape of the roof 512 may be a disk shape and may be seated on an upper surface of the stem 511.

The roof 512 may include a first support 512a seated on the stem 511, a second support 512b connected to the first support 512a, a third support 512d connected to the second support 512b, and a mount 512e protruding upward from the third support 512d. The supports 512a, 512b, and 512d and the mount 512e may be integrally formed.

An overall outer shape of the first support 512a may be annular and may form an edge of the roof 512. A lower surface of the first support 512a may contact an upper surface of the stem 511. The roof 512 may be supported by the stem 511.

An overall outer shape of the second support 512b may be annular, may be formed to protrude in a radially inward direction from an inner circumference of the first support 512a, and may extend in a circumferential direction. The first support 512a and the second support 512b may be distinguished by a rail 513 described later.

An overall external shape of the third support 512d may be annular and may be formed to protrude radially inward from an inner circumference of the second support 512b. The third support 512d may extend in the circumferential direction. The third support 512d may be defined as an inner region of the boundary wall 514 to be described later.

An overall external shape of the mount 512e may be cylindrical and may be formed to protrude upward from an upper surface of the third support 512d. The shaft body 570 may pass through a central portion of the mount 512e, and the shaft body 570 may be rotatably provided in a central portion of the mount 512e.

The base 510 may have a rail or ridge 513 protruding upward from the base 510. The rail 513 may extend in a circumferential direction to form a circular closed loop.

An overall outer shape of the rail 513 may be a ring shape, and the bearing 580 (FIG. 13) and/or 680 (FIG. 18) to be described later may move along a movement path formed by the rail 513. In addition, since the rotation of the bearing 580 and 680 may be supported by the rail 513, removal of the bearing 580 and/or 680 from the movement path may be prevented.

The base 510 may include a boundary wall or flange 514 formed to protrude upward from an upper surface of the base 510. An overall outer shape of the boundary wall 514 may be cylindrical and may extend in a circumferential direction to form a space 514s inside. The boundary wall 514 may be formed to protrude upward from an upper surface of the roof 512, and the second support 512b and the third support 512d may be distinguished based on the boundary wall 514. The boundary wall 514 may be formed radially inside the rail 513 and may be formed radially outside the rotating shaft housing 515 to be described later.

The driving unit 500 may include a first gear 540 connected to the motor 530 and a second gear 550 engaged with the first gear 540. The motor 530 may be provided above the rotating plate 520, and the first gear 540 may be provided below the rotating plate 520. The first gear 540 may be a spur gear or a pinion gear.

The second gear 550 may be seated on the base 510 and may be provided radially inside the first gear 540. The first gear 540 may be rotated in engagement with the second gear 550 at an outer radial side of the second gear 550. The second gear 550 may be a ring gear and may extend along a circumferential direction.

The second gear 550 may be connected to the boundary wall 514. The second gear 550 may contact and be attached to an outer circumferential surface of the boundary wall 514. The second gear 550 may be in a fixed state, and when the first gear 540 engages with the second gear 550 and rotates, the first gear 540 and the motor 530 connected to the first gear 540 may be integrally rotated with the rotating plate 520.

The second gear 550 may be provided between the rail 513 and the shaft body 570. The second gear 550 may be provided between the rail 513 and the boundary wall 514. Due to this arrangement structure, an inner space 514s of the boundary wall 514 can be used compactly as a space to arrange and support the shaft body 570.

The base 510 may include a rotating shaft housing 515 protruding toward the rotating plate 520. An overall external shape of the rotating shaft housing 515 may be cylindrical, and the rotating shaft housing 515 may provide a space in which the shaft body 570 may be inserted. The rotating shaft housing 515 may be formed to protrude upward from an upper surface of the mount 512e and may be formed to face an inner circumferential surface of the boundary wall 514.

A shaft bearing 560 (FIG. 13) to be described later may be provided inside the rotating shaft housing 515. The rotating shaft housing 515 may support the shaft bearing 560 to prevent the shaft bearing 560 and the shaft body 570 from being removed from the center of rotation.

Figure 12:
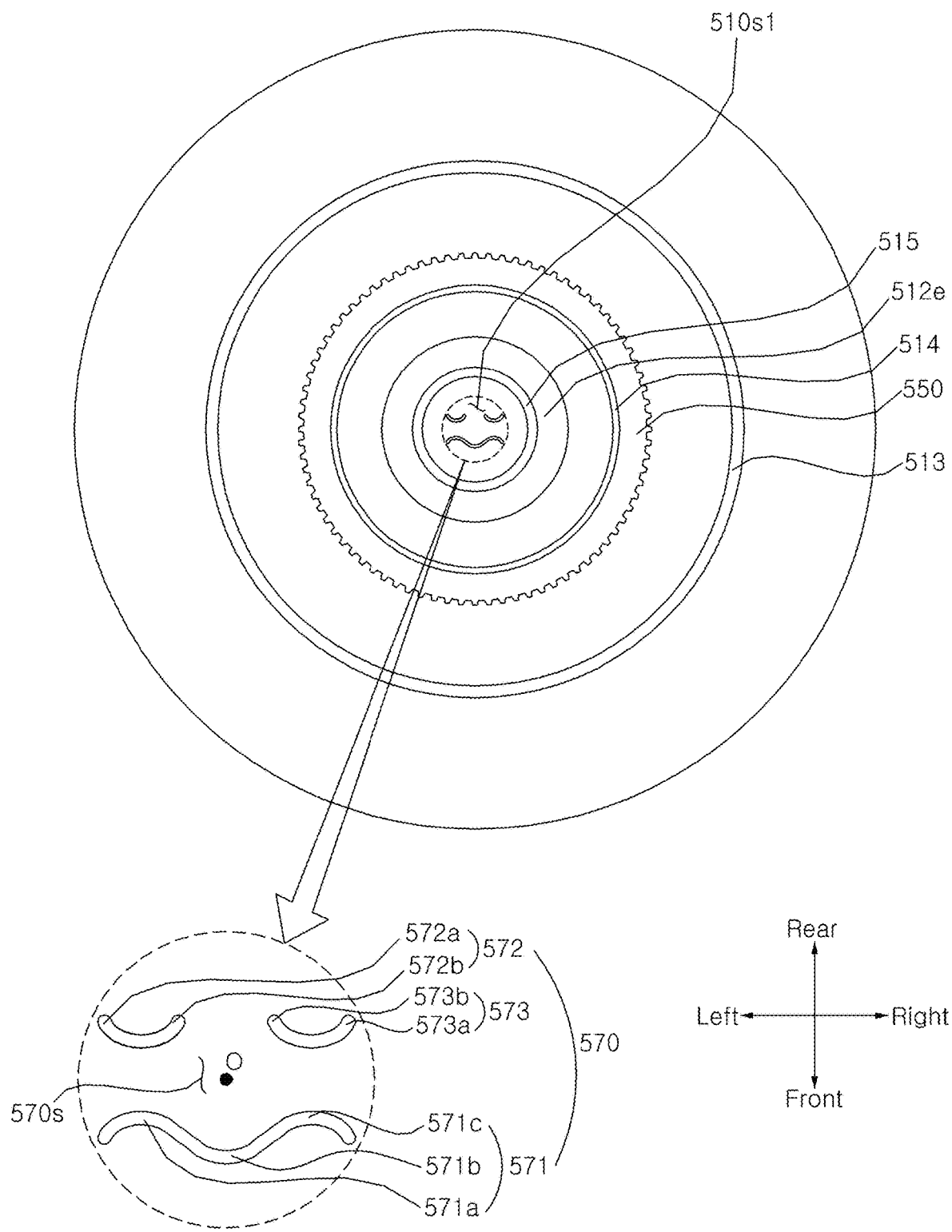
FIG. 12 is a top view of a base according to an embodiment.

Hereinafter, a detailed structure of the shaft body 570 and a relative positional relationship between the rail 513 and the second gear 550 and the shaft body 570 will be described with reference to FIG. 12. Referring to FIG. 12, a shaft insertion hole 510s1 may be formed inside the rotating shaft housing 515 through which the shaft body 570 penetrates, and into which a shaft holder 526 described later may be inserted. The shaft insertion hole 510s1 may be defined a space that penetrates rotation shaft housing 515 in a vertical direction. The shaft insertion hole 510s1 may correspond to a cylindrical space inside the rotating shaft housing 515.

The shaft body 570 may penetrate upward through the shaft insertion hole 510s1. The shaft body 570 may be provided such that a lower portion is provided inside the base 510 and an upper portion passes through the shaft insertion hole 510s1.

The shaft body 570 may include a first body 571 extending to be bent, a second body 572 provided to be spaced apart from the first body 571, and a third body 573 provided to be spaced apart from the first body 571 and the second body 572 respectively. The first body 571, the second body 572, and the third body 573 may be provided to be spaced apart from each other in the shaft insertion hole 510s1.

Based on FIG. 12, the first body 571 may be provided in front of the second body 572 and the third body 573, and the first body 571 may be extended longer than the second body 572 and the third body 573. The second body 572 and the third body 573 may be provided to face the first body 571 in a forward direction, and the second body 572 and the third body 573 may face each other in the left and right directions. The second body 572 may be provided on the left side and the third body 573 may be provided on the right side, but the second body 572 and the third body 573 may have the same shape.

The second body 572 and the third body 573 may be connected to each other to have the same shape as the first body 571. The shaft body 570 may include two first bodies 571 having the same shape, and the two first bodies 571 may be spaced apart so as to face each other in the front-rear direction.

The first body 571 may extend to be bent in a horizontal direction and may be bent 3 times along an extending direction. The first body 571 may include a left end portion 571a that is obliquely extended rearward, a right end portion 571c extending obliquely to the rear, and a core portion 571b that extends forward to be bent from each of the left end portion 571a and the right end portion 571c.

The second body 572 may extend to be bent in a horizontal direction and may be bent once along the extending direction. The second body 572 may include one (i.e., a first) end portion 572a extending obliquely forward and another (i.e., a second) end portion 572b extended to be bent from the one end portion 572a.

The third body 573 may extend to be bent in a horizontal direction and may be bent once along the extending direction. The third body 573 may include one (i.e., a first) end portion 573a extending obliquely forward, and another (i.e., a second) end portion 573b extended to be bent from the one end portion 573a. The second body 572 and the third body 573 may have the same shape and structure.

A wire through portion 570s may be formed between the first body 571 and the second body 572 and between the first body 571 and the third body 573. A wire 590 (FIG. 15) may be inserted into the shaft body 570 through a reel 574 (FIG. 15), which will be described later. The wire 590 may pass through the wire through portion 570s and extend upward to be electrically connected to the motor 530. The wire through portion 570s may be defined as an inner space of the shaft body 570 including the rotation center O of the rotating plate 520. Since the wire 590 may extend upward along the rotation center O and to be connected to the motor 530, while the rotating plate 520 is rotated, the wire 590 may not be twisted, and an electrical connection between the motor 530 and the wire 590 may be maintained.

As an upper side of the base 510 moves radially outward from the rotation center O, the rotation shaft housing 515, the boundary wall 514, the second gear 550, and the rail 513 may be sequentially arranged. Since the rail 513 may be provided radially outside the second gear 550, during a movement of the bearing 580, the rail 513 and/or bearing 580 may not interfere with the second gear 550. As the second gear 550 engages with the first gear 540 at an inner side of the rail 513, the second gear 550 may secure a sufficient distance from the bearing 580 and a distance of a power transmission path between the first gear 540 and the second gear 550 may be reduced, thereby minimizing power loss.

The rail 513, the second gear 550, and the shaft body 570 may be provided on the same horizontal plane. The rail 513, second gear 550, and shaft body 570 may be provided to vertically penetrate a predetermined horizontal plane including an upper surface of the base 510 and which is perpendicular to the vertical axis. Such horizontal plane may include an upper surface of the roof 512.

Due to this structure, a space between the rail 513 and the boundary wall 514 may receive the second gear 550, and a space inside the boundary wall 514 may receive the shaft body 570. All of the rail 513, the second gear 550, and the shaft body 570 may be provided on a single horizontal plane. A height occupied by the driving unit 500 in the vertical direction may be reduced so that a height of the lower case 120 spaced upward from the ground may be reduced. As a position of the suction hole 121 may be lowered, dust accumulated on the ground may be effectively suctioned through the suction hole 121.

Figure 13:
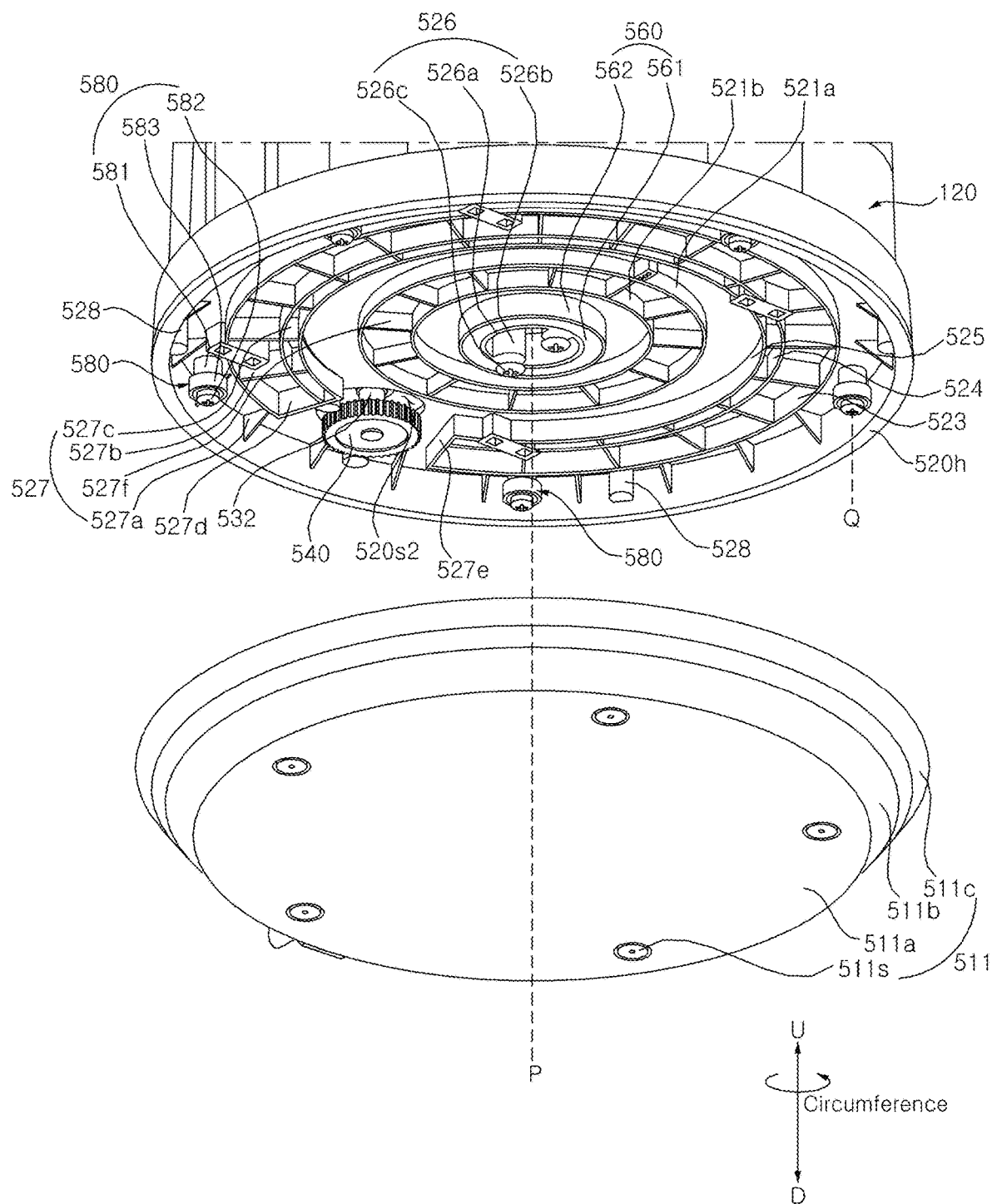
FIG. 13 is an exploded view of a driving unit according to an embodiment and viewed from below.

Hereinafter, a detailed configuration of the rotating plate 520 according to the first embodiment will be described with reference to FIG. 13 Referring to FIG. 13, the stem 511 may include a lower plate 511a which contacts a ground, a stem outer wall 511b extending obliquely upward from an edge of the lower plate 511a, and a stem seating portion or rim 511c extending radially outward from an upper end of the stem outer wall 511b.

An overall outer shape of the lower plate 511a may be a disk shape, and a plurality of holes 511s into which fastening members (e.g., bolts or screws) in the base 510 may be inserted may be formed to be spaced apart in a circumferential direction.

The stem outer wall 511b may extend in a circumferential direction and may be formed to be inclined outward in the radial direction. The stem seating portion 511c may extend in a circumferential direction and may be formed to face the edge 520h of the rotating plate 520 at an upper side. When the rotating plate 520 is seated on the base 510, the edge 520h may be seated and supported on an upper surface of the stem seating portion 511c.

The rotating plate 520 may include a first circumferential wall 523 extending in a circumferential direction, a second circumferential wall 524 extending in a circumferential direction at an inner side of the first circumferential wall 523, and a third circumferential wall 525 extending in a circumferential direction at an inner side of the second circumferential wall 524. The first circumferential wall 523, the second circumferential wall 524, and the third circumferential wall 525 may be concentric, and their diameters may increase in a radially outward direction.

The first circumferential wall 523, the second circumferential wall 524, and the third circumferential wall 525 may be formed by cutting. The first gear 540 may be provided at an area where the circumferential wall 523, 524 and 525 ends or is otherwise cut off.

The first gear 540 may be connected to the motor 530 through the driving motor shaft 532, and the driving motor shaft 532 and the first gear 540 may be provided under the motor insertion groove 520s2. The rotating plate 520 may include a shaft holder 526 protruding downward from the center portion 520a and providing a space into which the shaft body 570 is inserted. An overall external shape of the shaft holder 526 may be cylindrical, and a shaft insertion groove 520s1 may be formed inside the shaft holder 526.

The shaft holder 526 includes a holder outer wall 526a forming an outer shape of the shaft holder 526, a crest 526b protruding radially inward from the holder outer wall 526a, and a body fastening member 526c (e.g., screw) that is inserted into the crest 526b. The body fastening member 526c may be inserted into a body fastening hole formed at the crest 526b and opened in a vertical direction.

The shaft body 570 may be inserted into the shaft holder 526 and fixed to the shaft holder 526, and a curvature of the crest 526b may be formed to match the first body 571, the second body 572, and the third body 573, respectively. The shaft body 570 may be fixed to the rotating plate 520 by penetrating the body fastening member 526c through the shaft body 570 and the crest 526b while the shaft body 570 is inserted into the shaft holder 526. The shaft body 570 may be rotated integrally with the rotating plate 520, a structure of the shaft body 570 may be simplified, and a structure of the shaft body 570 may reduce or minimize interference between the shaft body 570 and the base 510.

The driving unit 500 may include a shaft bearing 560 provided to surround the shaft body 570. An overall external shape of the shaft bearing 560 may be cylindrical, and the shaft body 570 may penetrate inside the shaft bearing 560.

The shaft bearing 560 may include a first layer 561 provided so as to be rotatable integrally with the shaft holder 526, and a second layer 562 provided to surround the first layer 561. The first layer 561 may be provided radially inside the second layer 562, and an outer circumferential surface of the first layer 561 may contact an inner circumferential surface of the second layer 562.

The second layer 562 may be provided at an inner side of the rotating shaft housing 515, and an outer circumferential surface of the second layer 562 may contact an inner circumferential surface of the rotating shaft housing 515. The first layer 561 may be rotatably connected to the second layer 562, and the rotating plate 520 may be rotated together with the shaft holder 526. The second layer 562 may be fixedly provided at the rotating shaft housing 515 and may not be rotated even if the rotating plate 520 is rotated. The first layer 561 may support the rotation of the shaft holder 526, and the second layer 562 may support the rotation of the first layer 561. Lubricant oil may be injected between the first layer 561 and the second layer 562.

The shaft bearing 560 may be provided at the rotating plate 520 to surround the holder outer wall 526a of the shaft holder 526, or alternatively may be provided at the base 510 to be fixed to an inner surface of the rotating shaft housing 515. The rotating plate 520 may include a lower boss 528 protruding downward from the second seating portion 522. A plurality of lower bosses 528 may be formed to be spaced apart in a circumferential direction, and a case fastening hole 520e2 may be formed in the lower boss 528 to extend vertically.

The rotating plate 520 may include a plurality of ribs 527 extending in the radial direction. A plurality of ribs 527 may be formed to be spaced apart in a circumferential direction. The plurality of ribs 527 may include a first rib 527a extending from the edge 520h toward a first circumferential wall 523, a second rib 527b extending from the first circumferential wall 523 toward a second circumferential wall 524, and a third rib 527c extending from the second circumferential wall 524 toward a third circumferential wall 525. The plurality of ribs 527 may include a first boundary rib 527d provided at a cut portion of the circumferential walls 523, 524, and 525 and extending in a radial direction and a second boundary rib 527e provided at a cut portion of the circumferential walls 523, 524, 525 and spaced apart from the first boundary rib 527d in a circumferential direction.

The first boundary rib 527d may be a single rib 527d in which the second rib 527b and the third rib 527c are connected to each other to form a continuous surface. The first boundary rib 527d may extend in a radial direction and may be provided adjacent to one side (e.g., a first side) of the first gear 540. The second boundary rib 527e may be a single rib 527e in which the second rib 527b and the third rib 527c are connected to each other to form a continuous surface, and the second boundary rib 527e may be spaced apart from the first boundary rib 527d in a circumferential direction and provided adjacent to the other (e.g., a second) side of the first gear 540.

The first gear 540 may be provided and rotated between the first boundary rib 527d and the second boundary rib 527e. The ribs 527 may include a fourth rib 527f extending radially from the inside of the third circumferential wall 525. The fourth rib 527f may be located between a fourth circumferential wall 521a and a fifth circumferential wall 521b. The fourth circumferential wall 521a may be protruded from a lower surface of the first seating portion 521. The fifth circumferential wall 521b may be protruded from a lower surface of the first seating portion 521 and spaced apart from the fourth circumferential wall 521a. The fourth circumferential wall 521a and the fifth circumferential wall 521b may have an annular shape, and a plurality of fourth ribs 527f may be formed to be spaced apart along a circumferential direction.

The rotating plate 520 may include a plurality of bearings 580 arranged to be spaced apart from each other along a circumferential direction of the rotating plate 520 and supported to be rotatable on the base 510. Rollers may be used as a type of the bearing 580.

The bearing 580 may be provided between ribs among a plurality of ribs 527 spaced apart in a circumferential direction. For example, the bearing 580 may be provided between a plurality of first ribs 527a. The bearing 580 may be provided between the edge 520h and the first circumferential wall 523 spaced apart from each other in a radial direction.

The bearing 580 may include a support protrusion 581 formed to protrude downward from the rotating plate 520, a support shaft 582 connected to the support protrusion 581, and a wheel 583 through which the support shaft 582 passes. The support protrusion 581 may have an insertion hole into which the support shaft 582 may be inserted, and the support shaft 582 may be inserted upward to the support protrusion 581.

The support shaft 582 may support the wheel 583. Screws, pins, etc. may be used as a type of the support shaft 582. The support shaft 582 may be inserted into and fixed to the support protrusion 581 and may support the wheel 583 so that the wheel 583 is not removed downward.

The wheel 583 may be provided to be rotatable between the support protrusion 581 and the support shaft 582. A ball bearing or roller may be used as the wheel 583. The wheel 583 may be rotated using the support shaft 582 as a rotation axis.

When the rotating plate 520 is rotated, the wheel 583 may be rotated using the support shaft 582 as a rotation axis, and may be moved in a circumferential direction based on the rotation center O to revolve around the rotation center O. The shaft body 570 may provide a revolution axis P extending in the vertical direction and passing through the rotation center O, and the support shaft 582 may provide a rotational axis Q extending in the vertical direction. The revolution axis P and the rotational axis Q may be formed side by side. When the rotating plate 520 is rotated, the bearing 580 may be rotated about the rotational axis Q and at the same time move in a circumferential direction about the revolution axis P. The wheel 583 may be loosely coupled around the support shaft 582 to facilitate rotation.

Figure 14:
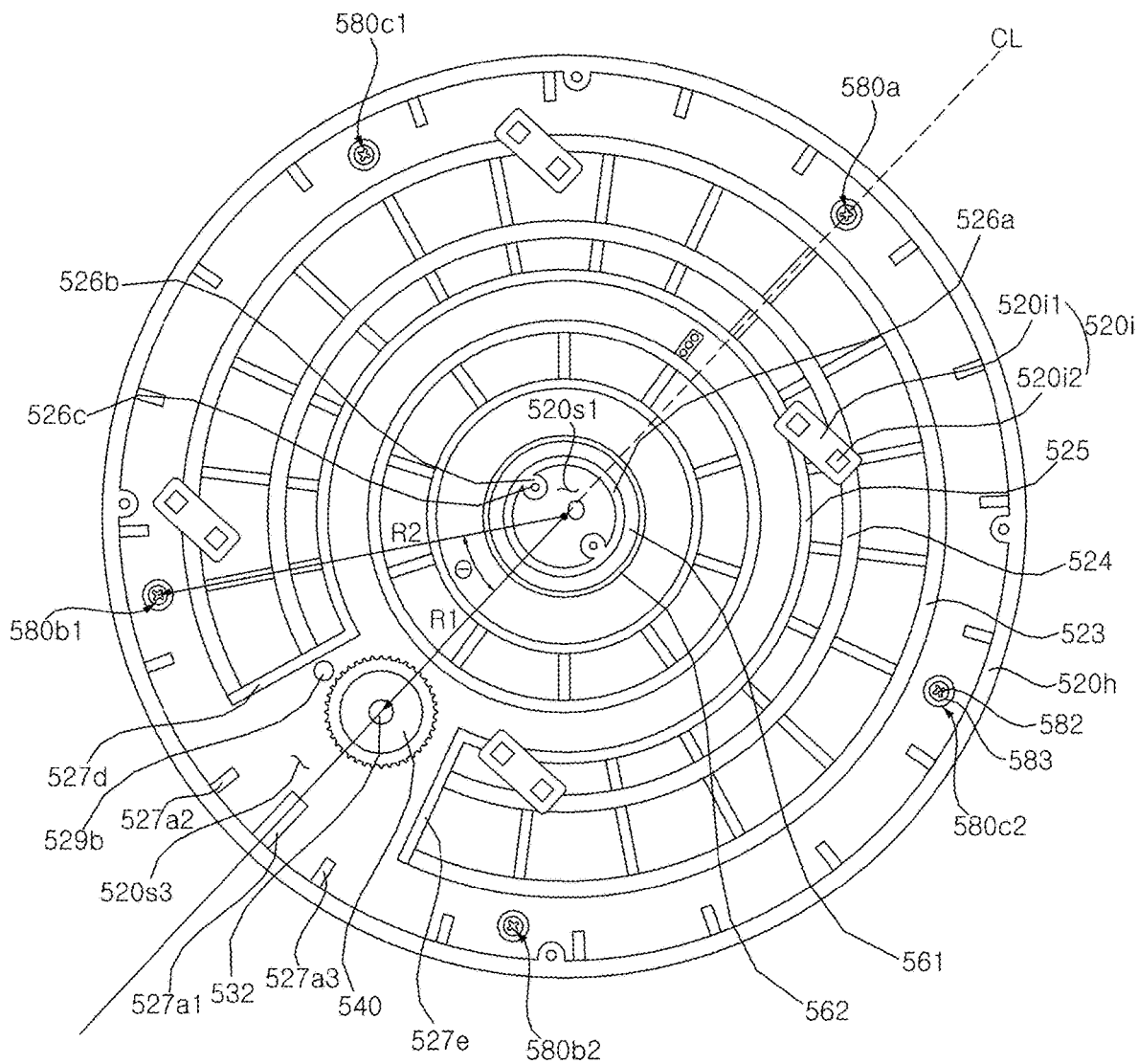
FIG. 14 is a bottom view of a rotating plate according to an embodiment.

Hereinafter, a detailed structure and arrangement position of the bearing 580 according to the first embodiment will be described with reference to FIG. 14. Referring to FIG. 14, a cutout portion 520s3 to receive the first gear 540 may be formed between the first boundary rib 527d and the second boundary rib 527e. The cutout portion 520s3 may be understood as a portion in which the circumferential walls 523, 524, and 525 are cut off or ended.

The first gear 540 may be provided so as to be rotatable inside the cutout portion 520s3, and reinforcing ribs 527a1, 527a2 and 527a3 extending from the edge 520h toward the first gear 540 may be formed at the cutout portion 520s3. Each of the reinforcing ribs 527a1, 527a2, and 527a3 may have a same shape as the first rib 527a. A boss support portion 529b connected to the stopper boss 529a and extending downward may be formed at the cutout portion 520s3.

A plurality of bearings 580 may be provided to be spaced apart from each other in a circumferential direction. As an example, five bearings 580 may be provided to be spaced apart from each other. However, a number of bearings 580 is not limited to five.

The plurality of bearings 580 may include a first bearing 580a provided opposite to the driving motor shaft 532 based on the rotation center O, a second bearing 580b provided between the driving motor shaft 532 and the first bearing 580a, and a third bearing 580c provided between the first bearing 580a and the second bearing 580. The first bearing 580a, the second bearing 580b, and the third bearing 580c may be different in an arrangement position. The shape and structure of each bearings 580a, 580b, 580c may be similar or identical.

The first bearing 580a may be provided opposite to the driving motor shaft 532 based on the rotation center O. The support shaft 582 of the first bearing 580, the driving motor shaft 532, and the rotation center O may be located on a center line CL. However, the first bearing 580a does not necessarily have to be provided on the center line CL. Due to this arrangement of the first bearing 580a, a region of the rotating plate 520 where support is weak due to being farthest from the driving shaft 532 may be stably supported by the first bearing 580a.

A separation angle θ between the second bearing 580b and the first gear 540 centered on the rotation center O may be an acute angle. The separation angle θ between the driving motor shaft 532 and the support shaft 582 centered on the rotation center O may be an acute angle. The second bearing 580b may include one side or a first bearing 580b1 provided adjacent to the first boundary rib 527d and the other or a second bearing 580b2 provided adjacent to the second boundary rib 527e, and the one side bearing 580b1 and the other side bearing 580b2 may be symmetrically provided with respect to the driving motor shaft 532.

Due to this arrangement of the second bearing 580b, a weak rigidity of the cutout portion 520s3 in which the circumferential walls 523, 524, and 525 are not formed may be reinforced or supplemented. By placing the second bearing 580b adjacent to the cutout portion 520s3, vibration generated by rotation of the first gear 540 provided in the cutout portion 520s3 and engaged with the second gear 550 may be reduced or suppressed as much as possible.

The third bearing 580c may include one (or a first) side bearing 580c1 spaced apart from one side of the first bearing 580a, and the other (or a second) side bearing 580c2 spaced apart from the other side of the first bearing 580a. The one side bearing 580c1 and the other side bearing 580c2 may be symmetrically provided with respect to the driving motor shaft 532.

The first gear 540 may rotate by being engaged with the second gear 550 at a radially inner side of the bearing 580. A first distance R1 from the rotation center O to the driving motor shaft 532 may be less than a second distance R2 from the rotation center O to the support shaft 582.

Due to this structure, a distance of the power transmission path from the driving motor shaft 532 to the rotational center O may be reduced, improving power or energy efficiency. By arranging the bearing 580 outside the first gear 540, vibration generated by the rotation of the first gear 540 may be effectively reduced. By arranging the bearing 580 as close to the edge 520h as possible, a load of heavy structures rotating on an upper side of the rotating plate 520 may be evenly distributed in a radial direction.

The rotating plate 520 may include an upper mount 520i connected to the substrate housing 160. The upper mount 520i may be formed to protrude downward from a lower surface of the rotating plate 520. The upper mount 520i may include a mount body 520i1 extending between the ribs 527 and a mount hole 520i2 formed to be opened vertically at the mount body 520i1. The rotating plate 520 may be connected to the substrate housing 160 through a predetermined fastening member (e.g., bolt or screw) penetrating through the mount hole 520i2.

Figure 15:
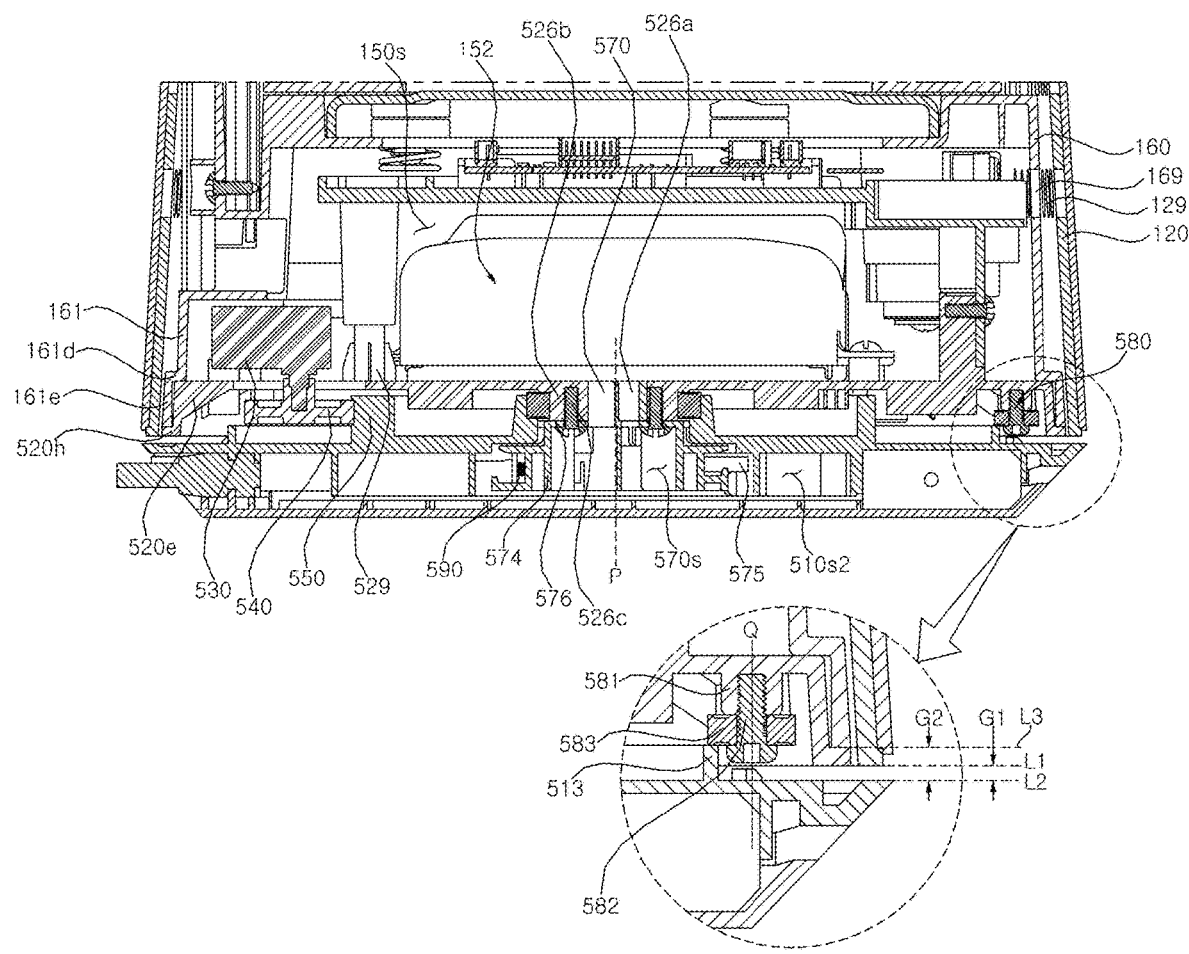
FIG. 15 is a longitudinal sectional view of a driving unit according to an embodiment.
Figure 20:
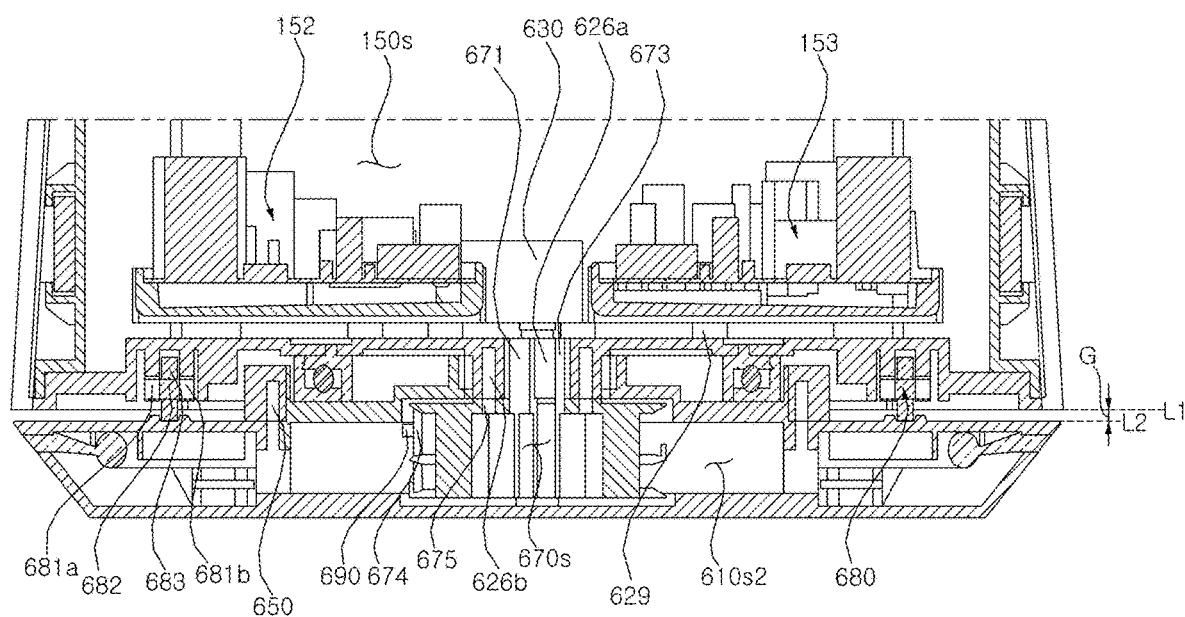
FIG. 20 is a longitudinal sectional view of a driving unit according to the second embodiment.

Hereinafter, an internal structure of the base 510 and a connection relationship between the base 510 and the rotating plate 520 and the substrate housing 160 and the lower case 120 according to the first embodiment will be described with reference to FIG. 15. Referring to FIG. 15, a control space 150s to receive substrates 152 and 153 (e.g., printed circuit boards or PCBs) may be formed inside the substrate housing 160. The substrate 152 and 153 may include a first substrate 152 and a second substrate 153 (FIG. 20). The first substrate 152 may control the driving unit 500, the airflow converter 400, and the fan assembly 300. The second substrate 153 may control the driving of the heater 240.

At least a portion of the motor 530 may be provided in the control space 150s of the substrate housing 160. The motor 530 may be rotated inside of the substrate housing 160. The substrates 152 and 153 and the motor 530 are provided together in the control space 150s of the substrate housing 160, integrated management of electric components can be achieved.

The substrate housing 160 may include a first magnetic member 169 protruding radially outward from the housing outer wall 161. The lower case 120 may include a second magnetic member 129 having a polarity opposite to that of the first magnetic member 169. The lower case 120 may be detached from the substrate housing 160 by the magnetic force of the first magnetic member 169 and the second magnetic member 129.

The housing outer wall 161 may include a fastening portion 161d extending radially outward from a lower end of the housing outer wall 161, and a support portion 161e extending downward from an outer end of the fastening portion 161d. The fastening portion 161d may be mounted on the third rim 520e and fixed to the rotating plate 520 by a fastening member passing through the case fastening hole 520e1. The support portion 161e may be seated on the edge 520h and supported by the edge 520h. Alternatively, a fastening member penetrating through the case fastening hole 520e1 may be directly connected to the lower case 120 rather than the substrate housing 160, so that the lower case 120 is connected to the rotating plate 520 and fixed to the rotating plate 520.

A space 510s2 may be formed inside the stem 511 of the base 510. The shaft body 570 may be inserted into the space 510s2. The shaft body 570 may include a first body 571 provided in the rotating shaft housing 515, a reel 574 connected to the first body 571, provided under the first body 571, and received in the base 510, and a fastening plate 576 protruding in a radial direction and connected to the shaft holder 526.

The reel 574 may be provided under the rotating shaft housing 515 and may have a cylindrical shape in which the wire through portion 570s is formed. The fastening plate 576 may extend radially inward from an upper portion of the reel 574, and the body fastening member 526c may penetrate the fastening plate 576 and the crest 526b to fix the shaft body 570 to the rotating plate 520.

The wire 590 may receive power from an external or commercial power source. The wire 590 may be wound a predetermined number of times along an outer circumferential surface of the reel 574. The wire 590 may be electrically connected to the motor 530 through the wire through portion 570s formed inside the reel 574. A reel bearing 575 to support a winding of the wire 590 may be provided inside the base 510.

A vertical or first gap G1 may be formed between the base 510 and the rotating plate 520. The gap G1 may be understood as a space between the first line L1 extending along a lower surface of the rotating plate 520 and the second line L2 extending along an upper surface of the base 510.

A vertical or second gap G2 may be formed between the base 510 and the bearing 580. The gap G2 may be understood as a space between the second line L2 extending along an upper surface of the base 510 and the third line L3 extending along a lower surface of the bearing 580. A part of the bearing 580 may be in contact with the base 510, and the rest of the bearing 580 may be spaced apart from an upper surface of the base 510 to form the gap G2.

The gaps G1 and G2 may be formed by the base 510 directly supporting the bearing 580. An outer side (e.g at the wheel 583 and/or a bushing) of the bearing 580 may be seated on an upper side of the rail 513 and may be moved in a circumferential direction along the rail 513. A lower surface of the rotating plate 520 may be spaced apart from and not in contact with an upper surface of the base 510, and the rotating plate 520 may be rotatably supported by the base 510 by the bearing 580 seated on the rail 513.

As the bearing 580 is rotated while seated on the rail 513 protruding upward, the rotating plate 520 and the bearing 580 may be rotated while maintaining the gaps G1 and G2. Accordingly, abrasion of the driving unit 500 due to friction generated by the rotation may be reduced or prevented.

The support shaft 582 of the bearing 580 may be provided outside the rail 513 in a radial direction. An inner part or section of the bearing 580 may be supported by the rail 513. As the support shaft 582 of the bearing 580 is provided outside the rail 513, a load of the blower 1 may be evenly distributed in a radial direction.

Hereinafter, an operation motion of the driving unit 500 according to the first embodiment will be described with reference to FIGS. 10 to 15. Referring to FIGS. 10 to 15, when the motor 530 makes the driving motor shaft 532 rotate with power supplied through the wire 590, the first gear 540 connected to the driving motor shaft 532 may be rotated. The second gear 550 may be fixed to the boundary wall 514, and the first gear 540 may be rotated along an outer circumference of the second gear 550 extending in a circumferential direction. As the first gear 540 is rotated, the rotating plate 520 may be rotated in a circumferential direction with the shaft body 570 as a rotating shaft. While the rotating plate 520 is rotated, the rotation of the rotating plate 520 may be supported by a shaft bearing 560 in which at least a portion is rotated together with the shaft holder 526. When the rotating plate 520 is rotated, the bearing 580 may be rotated about the rotation axis Q and, at the same time, may be moved in a circumferential direction around the revolution axis P. The bearing 580 may be moved in a circumferential direction while seated on and supported by the rail 513.

By this structure, the plurality of bearings 580 that are spaced apart from each other in a circumferential direction and directly supported by the base 510 may evenly distribute the heavy load of the blower 1 to the base 510, and a rotation of the blower 1 may be stably supported. As the bearing 580 is rotated about the rotation axis Q and supports the load of the blower 1 body, abrasion caused by friction between the bearing 580 and the base 510 surface may be reduced or prevented, and a use life of the bearing 580 may be extended.

Figure 16:
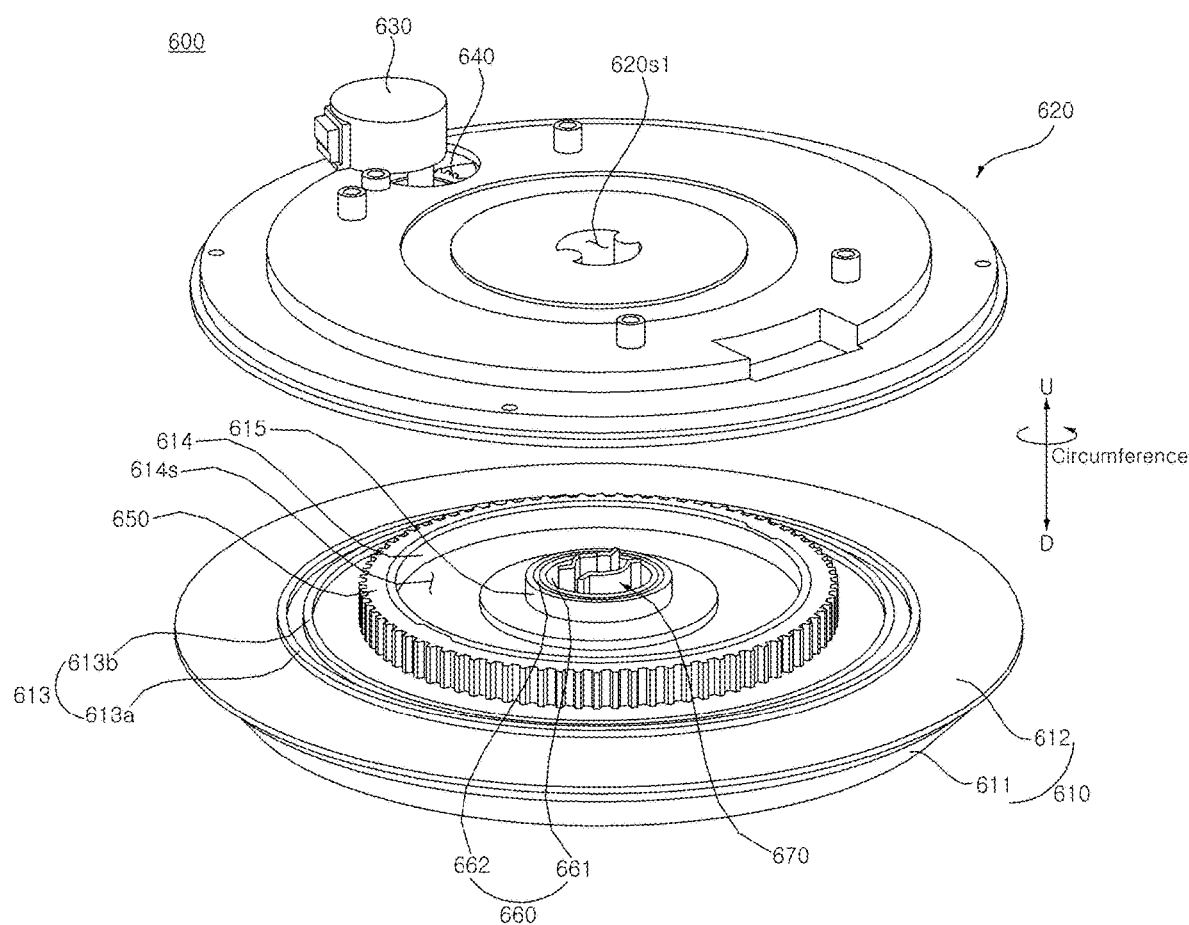
FIG. 16 is an exploded perspective view of a driving unit according to a second embodiment.

Hereinafter, a structure of a base 610 according to a second embodiment will be described with reference to FIG. 16. Features of the base 610 may be similar to the base 510 described with reference to the first embodiment, and similar features may be omitted in the following explanation.

The base 610 may include a stem 611 having an inner space and configured to contact the ground, floor surface, tabletop, etc. The base 610 may include a roof 612 provided on an upper side of the stem 611 and covering the inner space of the stem 611. Since the stem 611 and the roof 612 may be the same as or similar to the stem 511 and the roof 512 according to the first embodiment, detailed descriptions will be omitted.

The base 610 may have a rail 613 protruding upward from the base 610. The rail 613 may include a first rail 613a formed to protrude upward from an upper surface of the roof 612 and a second rail 613b formed at an inner side of the first rail 613a and facing the first rail 613a. The first rail 613a and the second rail 613b may have a ring shape, and the first rail 613a and the second rail 613b may be concentric. The bearing 680 (FIG. 18) described later may be rolled in a circumferential direction between the first rail 613a and the second rail 613b, and the first rail 613a and the second rail 613b may prevent the bearing 680 from deviating from a rotating path.

The base 610 may include a plurality of boundary walls 614 protruding upward from an upper surface of the base 610. An overall outer shape of the boundary wall 614 may be cylindrical and may extend in a circumferential direction to form a space 614s inside. The boundary wall 614 may be formed to protrude upward from an upper surface of the roof 612, may be formed at an inner side of the rail 613, and may be formed at an outer side of the rotating shaft housing 615 to be described later.

The driving unit 600 may include a first gear 640 connected to the motor 630 and a second gear 650 engaged with the first gear 640. The motor 630 may be provided above the rotating plate 620, and the first gear 640 may be provided below the rotating plate 620. The first gear 640 may be a spur gear or a pinion gear.

The second gear 650 may be seated on the base 610 and provided at an inner side of the first gear 640. The first gear 640 may be rotated by engaging the second gear 650 at an outer side of the second gear 650. The second gear 650 may be a ring gear and may extend along a circumferential direction.

The second gear 650 may be connected to the boundary wall 614. The second gear 650 may contact and attached to an outer circumferential surface of the boundary wall 614. The second gear 650 may be in a fixed state, and when the first gear 640 rotates, the first gear 640 and the motor 630 may be rotated integrally.

The second gear 650 may be provided between the rail 613 and the shaft body 670. The second gear 650 may be provided between the rail 613 and the boundary wall 614. Due to this structure, a space 614s formed inside the boundary wall 614 may be used compactly as a space in which a structure supporting the shaft body 670 is arranged.

The base 610 may include a rotating shaft housing 615 protruding toward the rotating plate 620. An overall external shape of the rotating shaft housing 615 may be cylindrical, and the rotating shaft housing 615 may provide a space in which the shaft body 670 may be inserted. The rotating shaft housing 615 may be formed to face an inner circumferential surface of the boundary wall 614.

The driving unit 600 may include a shaft bearing 660 provided to surround the shaft body 670 inserted into the shaft through hole 620s1. An overall external shape of the shaft bearing 660 may be cylindrical, and the shaft body 670 may pass through an inner side of the shaft bearing 660.

The shaft bearing 660 may include a first layer 661 provided to be rotatable integrally with a shaft holder 626 (FIG. 18) and a second layer 662 provided to surround the first layer 661. The first layer 661 may be provided at an inner side of the second layer 662, and an outer circumferential surface of the first layer 661 may contact an inner circumferential surface of the second layer 662.

The second layer 662 may be provided at an inner side of the rotating shaft housing 615. An outer circumferential surface of the second layer 662 may contact an inner circumferential surface of the rotating shaft housing 615.

The first layer 661 may be rotatably connected to the second layer 662, and the rotating plate 620 may be rotated together with the shaft holder 626. The second layer 662 may be fixedly provided at the rotating shaft housing 615 and may not be rotated even if the rotating plate 620 is rotated. The first layer 661 may support the rotation of the shaft holder 626, and the second layer 662 may support the rotation of the first layer 661. Lubricant oil may be injected between the first layer 661 and the second layer 662.

Figure 17:
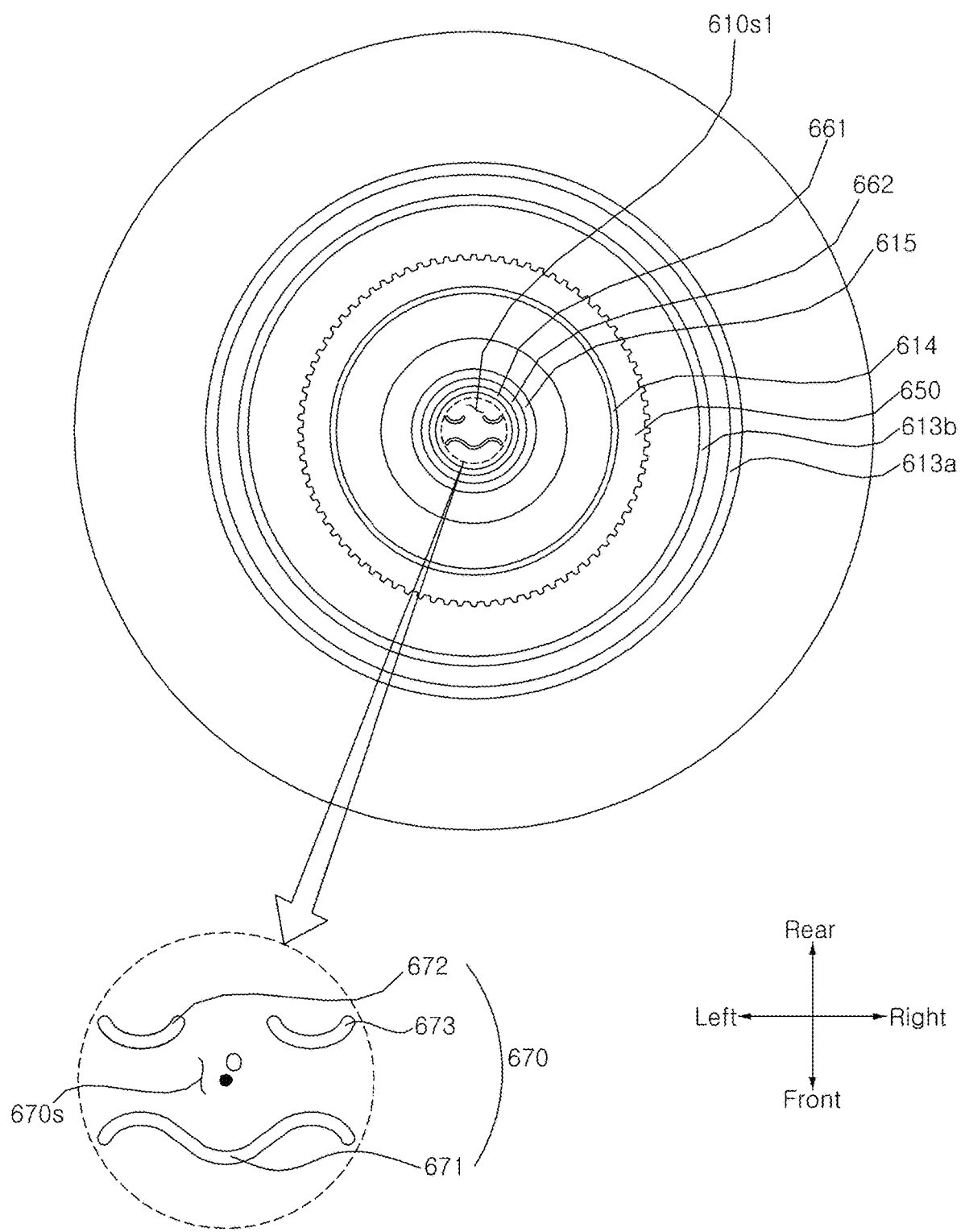
FIG. 17 is a top view of a base according to the second embodiment.

Hereinafter, referring to FIG. 17, a detailed structure of the shaft body 670 according to the second embodiment and the relative positional relationship between the rail 613, the second gear 650, and the shaft body 670 are described. Referring to FIG. 17, a shaft insertion hole 610s1 through which the shaft body 670 is penetrated and the shaft holder 626 to be described later is inserted may be formed at an inner side of the first layer 661. The shaft insertion hole 610s1 may define a space that vertically penetrates the base 610. The space defined by the shaft insertion hole 610s1 may be a cylindrical space inside the first layer 661.

The shaft body 670 may penetrate upward through the shaft insertion hole 610s1. The shaft body 670 may be provided so that a lower part or portion is provided inside the base 610 and an upper part or portion passes through the shaft insertion hole 610s1.

The shaft body 670 may include a first body 671 extending to be bent, a second body 672 provided to be spaced apart from the first body 671, and a third body 673 provided to be spaced apart from the first body 671 and the second body 672. The first body 671, the second body 672, and the third body 673 may be provided to be spaced apart from each other in the shaft insertion port 610s1. Since the shaft body 670 may be the same as or similar to the shaft body 570 according to the first embodiment, a detailed description thereof will be omitted.

A wire through portion 670s may be provided between the first body 671 and the second body 672 and between the first body 671 and the third body 673. A wire 690 (FIG. 20) to be described later may pass through the wire through portion 670s and extend upward to be electrically connected to the motor 630. The wire through portion 670s may be defined as an inner space of the shaft body 670 including the rotation center O of the rotating plate 620. Since the wire 690 extends upward along the rotation center O and is connected to the motor 630, even if the rotating plate 620 is rotated, the wire 690 may not be twisted, and a connection of the wire 690 and the motor 630 may be maintained.

The shaft bearing 660, the rotating shaft housing 615, the boundary wall 614, the second gear 650, and the rail 613 may be sequentially arranged in that order in a radial direction from the rotation center O.

The rail 613, the second gear 650, and the shaft body 670 may be provided on a same or predetermined horizontal plane that is perpendicular to a vertical line and includes an upper surface of the base 610. Since a description thereof is the same as or similar to that of the first embodiment, a detailed description will be omitted.

Figure 18:
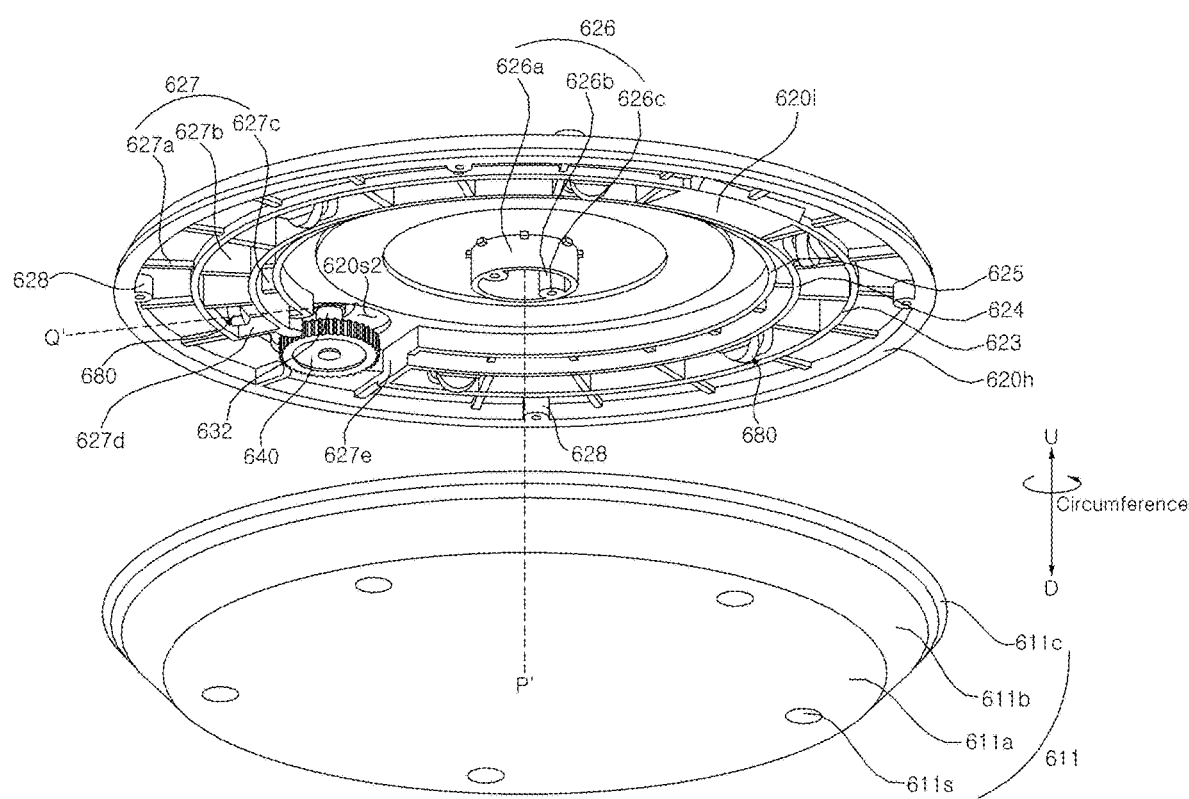
FIG. 18 is an exploded view of a driving unit according to the second embodiment.

Hereinafter, a detailed configuration of a rotating plate 620 according to the second embodiment will be described with reference to FIG. 18. Referring to FIG. 18, the stem 611 may include a lower plate 611a in contact with the ground, floor, or other support surface, a stem outer wall 611b extending obliquely upward from an edge of the lower plate 611a, and a stem seating portion or rim 611c extending radially outward from an upper end of the stem outer wall 611b.

An overall outer shape of the lower plate 611a may be a disk shape, and a plurality of holes 611s into which fastening members in the base 610 may be inserted may be formed to be spaced apart in a circumferential direction. The stem outer wall 611b may extend in a circumferential direction and may be formed to be inclined outward in the radial direction.

The stem seating portion 611c may extend in a circumferential direction and may be formed to face the edge 620h of the rotating plate 620. When the rotating plate 620 is seated on the base 610, the edge 620h may be seated and supported on an upper surface of the stem seating portion 611c.

The rotating plate 620 may include a first circumferential wall 623 extending in a circumferential direction, a second circumferential wall 624 extending in a circumferential direction at an inner side of the first circumferential wall 623, and a third circumferential wall 625 extending in a circumferential direction at an inner side of the second circumferential wall 624. The first circumferential wall 623, the second circumferential wall 624, and the third circumferential wall 625 may be concentric, and a diameter may increase as they are positioned in a radially outward direction.

The first circumferential wall 623, the second circumferential wall 624, and the third circumferential wall 625 may be formed by cutting. The first gear 640 may be provided at a cut portion of the circumferential walls 623, 624 and 625. The first gear 640 may be connected to the motor 630 through the motor shaft 632, and the motor shaft 632 and the first gear 640 may be provided under a motor insertion groove 620s2.

The rotating plate 620 may include a shaft holder 626 that provides a space into which the shaft body 670 is inserted. An overall external shape of the shaft holder 626 may be cylindrical, and a shaft insertion groove 620s1 may be formed inside the shaft holder 626.

The shaft holder 626 may include a holder outer wall 626a forming an outer shape of the shaft holder 626, a crest 626b protruding radially inward from the holder outer wall 626a, and a body fastening hole 626c formed to be opened in the vertical direction on the crest 626b. The shaft body 670 may be inserted into the shaft holder 626 and fixed to the shaft holder 626, and the radius of curvature of the crest 626b may be formed to match to a shape of the bodies 671, 672 and 673. When the shaft body 670 is inserted into the shaft holder 626, a predetermined fastening member may pass through the body fastening hole 626c to fix the shaft body 670 to the rotating plate 620. The shaft body 670 may be rotated integrally with the rotating plate 620. The shaft body 670 may simplify a structure of a rotating shaft of the rotating plate 620 and minimize interference between the rotating shaft and the base 610.

The rotating plate 620 may include a lower boss 628 formed to protrude downward. A plurality of lower bosses 628 may be formed to be spaced apart in a circumferential direction, and the lower boss 628 may be connected to the case 100.

The rotating plate 620 may include a plurality of ribs 627 extending in a radial direction and spaced apart in a circumferential direction. The plurality of ribs 627 may include a first rib 627a extending from the edge 620h toward the first circumferential wall 623, a second rib 627b extending from the first circumferential wall 623 toward the second circumferential wall 624, and a third rib 627c extending from the second circumferential wall 624 toward the third circumferential wall 625. Each of the ribs 627a, 627b, and 627c may be provided on the same straight line extending in a radial direction.

The plurality of ribs 627 may also include a first boundary rib 627d and a second boundary rib 627e. The first boundary rib 627d may be provided at a cut-off portion of the circumferential walls 623, 624, 625 and extend in a radial direction. The second boundary rib 627e may be provided at the cut-off portion of the circumferential walls 623, 624, and 625 and spaced apart from the first boundary rib 627d in a circumferential direction.

The first boundary rib 627d may be a single rib 627d in which the first rib 627a, the second rib 627b, and the third rib 627c are connected to each other to form a continuous surface. The first boundary rib 627d may extend in a radial direction and may be provided adjacent to one (or a first) side of the first gear 640.

The second boundary rib 627e may be a single rib 627e in which the first rib 627a, the second rib 627b, and the third rib 627c are connected to each other to form a continuous surface. The second boundary rib 627e may be spaced apart from the first boundary rib 627d in a circumferential direction and provided adjacent to the other (or a second) side of the first gear 640.

The first gear 640 may be provided and rotated between the first boundary rib 627d and the second boundary rib 627e. The rotating plate 620 may comprise a plurality of bearings 680 arranged to be spaced apart from each other along a circumferential direction of the rotating plate 620 and supported to be rotatable on the base 610. A roller may be used as a type of bearing 680.

The bearings 680 may be provided between the ribs of the plurality of ribs 627. For example, the bearings 680 may be provided between a plurality of second ribs 627b. The bearing 680 may be provided between the circumferential walls 623, 624, and 625 spaced apart in a radial direction and may also be provided between the first circumferential wall 623 and the second circumferential wall 624.

When the rotating plate 620 is rotated, the bearing 680 may be rotated about a support shaft 683 (FIG. 19) described later and may be moved in a circumferential direction about the rotation center O to revolve around the rotation center O. The shaft body 670 may extend in a vertical direction and may provide a revolution axis P' passing through the rotation center O, and the support shaft 683 may provide a rotational axis Q' extending in a radial direction. The revolution axis P' and the rotation axis Q' may be extended perpendicular to each other. When the rotating plate 620 is rotated, the bearing 680 may be rotated about the rotation axis Q' and at the same time move in a circumferential direction about the revolution axis P'.

The rotating plate 620 may include a protrusion receiving portion 620i formed to protrude downward. The protrusion receiving portion 620i may form a lower boundary of the groove 520e1 into which a protrusion protruding from the lower case 120 is inserted. The protrusion receiving portion 620*i* may be provided between ribs among the plurality of ribs 627. The protrusion receiving part 620*i* may fix the protrusion of the lower case 120 to fix the lower case 120 to the rotating plate 620. Alternatively, it is also possible to fix the lower case 120 only with the lower protrusion 628 without the protrusion receiving portion 620*i*.

Figure 19:
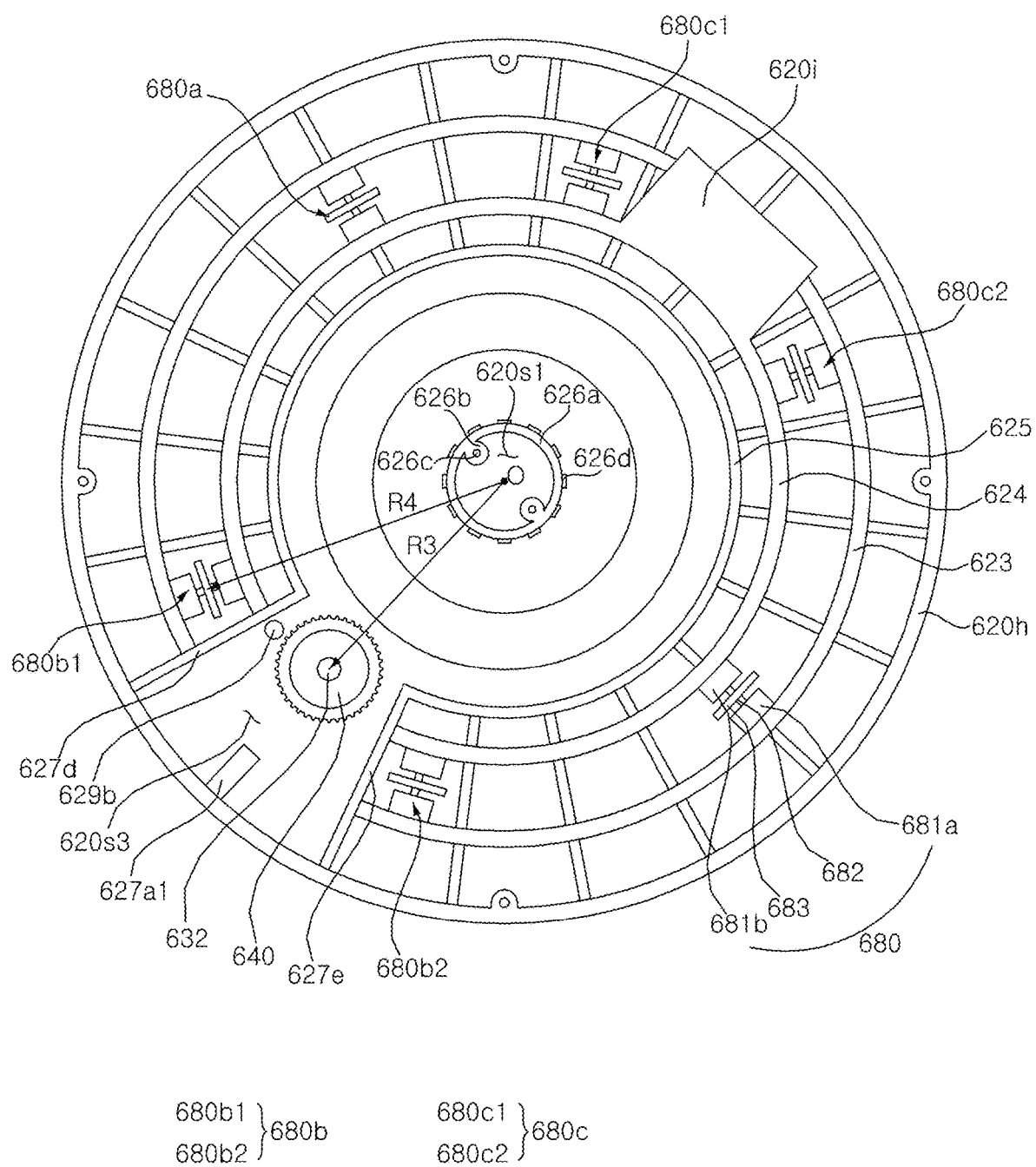
FIG. 19 is a bottom view of a rotating plate according to the second embodiment.

Hereinafter, a detailed structure and arrangement position of the bearing 680 according to a second embodiment will be described with reference to FIG. 19. Referring to FIG. 19, a cutout portion 620*s*3 to receive the first gear 640 may be formed between the first boundary rib 627*d* and the second boundary rib 627*e*. The cutout portion 620*s*3 may be a portion in which the circumferential walls 623, 624, and 625 are cut or ended.

The first gear 640 may be arranged to be rotatable at the cutout portion 620*s*3, and a reinforcing rib 627*a*1 extending from the edge 620*h* toward the first gear 640 may be formed at the cutout portion 620*s*3. A boss support portion 629*b* connected to the stopper boss 529*a* and extending downward may be formed at the cutout portion 620*s*3.

A holder protrusion 626*d* protruding radially outward from the holder outer wall 626*a* may be formed at the shaft holder 626. A plurality of holder protrusions 626*d* may be formed to be spaced apart in a circumferential direction.

The bearing 680 may include a first support protrusion 681 connected to the first circumferential wall 623, a second support protrusion 682 connected to the second circumferential wall 624, a wheel 684 provided between the first support protrusion 681 and the second support protrusion 682, and a support shaft 683 extending from the first support protrusion 681 toward the second support protrusion 682, penetrating the wheel 684, and extending to face an upper surface of the base 610. The first support protrusion 681 may be fixed on the first circumferential wall 623, and the second support protrusion 682 may be fixed on the second circumferential wall 624.

The support shaft 683 may be connected to the first support protrusion 681 and the second support protrusion 682 and may support a rotation of the wheel 684. The rotation of the wheel 684 may be supported by the support shaft 683, and the wheel 684 may be rotated about a rotation axis extending in a radial direction. The wheel 684 may be rotatably connected to the support shaft 683.

A plurality of bearings 680 (e.g., six bearings 680) may be provided to be spaced apart in a circumferential direction. Embodiments disclosed herein are not limited to a number of bearings 680. The plurality of bearings 680 may include a first bearing 680*a* provided between the plurality of ribs 627, a second bearing 680*b* provided adjacent to the boundary ribs 627*d* and 627*e*, and a third bearing 680*c* provided adjacent to the protrusion receiving portion 620*i*. The first bearing 680*a*, the second bearing 680*b*, and the third bearing 680*c* may be distinguished according to an arrangement position, but each bearing 680*a*, 680*b*, 680*c* may have the same or similar structure. The first bearing 680*a* may mean all bearings other than the second bearing 680*b* and the third bearing 680*c*.

The second bearing 680*b* may include one side bearing 680*b*1 provided adjacent to the first boundary rib 627*d*, and the other side bearing 680*b*2 provided adjacent to the second boundary rib 627*e*. Here, "being provided adjacent" may mean that the second bearing 680*b* is provided between the boundary ribs 627*d* and 627*e* and the rib 627 provided nearest to the boundary ribs 627*d* and 627*e*. One side bearing 680*b*1 may be provided between the first boundary rib 627*d* and the rib 627 provided nearest to the first boundary rib 627*d*, and the other side bearing 680*b*2 may be provided between the second boundary rib 627*e* and the rib 627 provided nearest to the second boundary rib 627*e*.

Due to this arrangement of the second bearing 680*b*, a weak rigidity of the cutout portion 620*s*3 in which the circumferential walls 623, 624, and 625 are not formed be supplemented or reinforced. Vibration generated as the first gear 640 provided in the cutout portion 620*s*3 is rotated in engagement with the second gear 650 may be suppressed or reduced due to placing the second bearing 680*b* adjacent to the cutout 620*s*3.

The third bearing 680*c* may include one (or a first) side bearing 680*c*1 spaced apart from one side of the protrusion receiving portion 620*i*, and the other (or a second) side bearing 680*c*2 spaced apart from the other side of the protrusion receiving portion 620*i*. The third bearing 680*c* may be provided adjacent to the protrusion accommodating portion 620*i*. Here, "being provided adjacent to the protrusion receiving portion 620*i*" may mean that the third bearing 680*c* is provided between the two ribs 627 arranged closest to the protrusion receiving portion 620*i*. Due to this arrangement of the third bearing 680*c*, a weak stiffness or rigidity of the adjacent region in which the protrusion receiving portion 620*i* is formed may be reinforced or supplemented.

The first gear 640 may be rotated by engaging the second gear 650 at an inner side of the bearing 680. A third distance R3 from the rotation center O to the motor shaft 632 may be less than a fourth distance R4 from the rotation center O to the support shaft 683 of the bearing 680. Due to this structure, a length of a power transmission path from the rotational shaft 632 of the first gear 640 to the rotational center O may be reduced or minimized, thereby improving power or energy efficiency. By placing the bearing 680 at an outer side of the first gear 640, vibrations generated by the rotation of the first gear 640 may be effectively reduced. By arranging the bearing 680 as close to the edge 620*h* as possible, the load of heavy structures rotating on an upper side of the rotating plate 620 may be evenly distributed in the radial direction.

Hereinafter, referring to FIG. 20, an internal structure of the base 610 according to the second embodiment and the connection relationship between the base 610 and the rotating plate 620, the substrate housing 160, and the lower case 120 will be described. Referring to FIG. 20, a control space 150*s* configured to receive substrates 152 and 153 may be formed inside the substrate housing 160. The substrates 152 and 153 may include a first substrate 152 and a second substrate 153. The first substrate 152 may be configured to control the driving unit 600, the airflow converter 400, and the fan assembly 300. The second substrate 153 may be configured to control a driving of the heater 240.

At least a portion of the motor 630 may be provided in the control space 150*s* of the substrate housing 160. The motor 630 may be rotated inside of the substrate housing 160. The connection structure between the rotating plate 620, the substrate housing 160, and the lower case 120 may be the same as or similar to that of the first embodiment, and thus a detailed description thereof will be omitted.

A space 610*s*2 may be formed inside the stem 611 of the base 610 The shaft body 670 may be inserted in the space 610*s*2. The shaft body 670 may include a first body 671 provided in the rotating shaft housing 615 and a reel 674 connected to the first body 671, provided under the first body 671, and received inside the base 610.

The reel 674 may be provided under the rotating shaft housing 615 and may have a cylindrical shape in which a wire through portion 670*s* is formed. At the reel 674, a fastening boss 675 protruding upward may be formed, and the fastening boss 675 may be inserted into the crest 626b of the shaft holder 626 so as to fix the shaft body 670 to the rotating plate 620.

The wire 690 may receive power from an external or commercial power source or supply. The wire 690 may be wound a predetermined number of times along an outer circumferential surface of the reel 674 and may be electrically connected to the motor 630 by passing through the wire through portion 670s formed in the reel 674. Due to the structure of the reel 674 and the wire through portion 670s, twisting of the wire 690 caused by the rotation of the rotating plate 620 may be reduced or prevented, and electrical connection between the wire 690 and the motor 630 may be maintained.

The rotating plate 620 may be connected to the substrate housing 160 by an upper boss 629 protruding upward of the rotating plate 620. A vertical gap G between the base 610 and the rotating plate 620 may be formed. The gap G may be understood as a space between the first line L1 extending along a lower surface of the rotating plate 620 and the second line L2 extending along an upper surface of the base 610.

The gap G may be formed by arranging the bearing 680 to protrude from the rotating plate 620 toward the base 610. The bearing 680 may be provided to protrude downward from a lower surface of the rotating plate 620 toward the base 610 by the gap G. The lower surface of the rotating plate 620 may be spaced apart from and not in contact with an upper surface of the base 610, and the rotating plate 620 may be supported so as to be rotatable to the base 610 only by the bearing 680. Due to this structure, the rotating plate 620 may be rotated while maintaining the gap G formed between the base 610. Abrasion of the driving unit 600 due to friction generated between the rotating plate 620 and the base 610 may be reduced or prevented.

Hereinafter, an operating motion of the driving unit 600 according to the second embodiment will be described with reference to FIGS. 16 to 20. Referring to FIGS. 16 to 20, when the motor 630 rotates the motor shaft 632 with power supplied through the wire 690, the first gear 640 connected to the motor shaft 632 may be rotated. The second gear 650 may be fixed to the boundary wall 614, and the first gear 640 may be rotated along an outer circumference of the second gear 650 extending in a circumferential direction.

As the first gear 640 is rotated, the rotating plate 620 may be rotated about the shaft body 670. While the rotating plate 620 is rotated, the rotation of the rotating plate 620 may be supported by a shaft bearing 660 in which at least a portion is rotated together with the shaft holder 626.

When the rotating plate 620 is rotated, the bearing 680 may be rolled on an upper surface of the base 610. The bearing 680 may be rolled between a pair of rails 613, and a load of the bearing 680 may be supported by the base 610. When the rotating plate 620 is rotated, the bearing 680 may be rotated about rotation axis Q' and moved in a circumferential direction around the revolution axis P'.

By the above-described support structure, a plurality of bearings 680 provided to be spaced apart in a circumferential direction and directly supported by the base 610 may distribute the heavy load of the blower 1 body to the base 610 uniformly. Accordingly, the bearing 680 may support the rotation of the blower 1 stably. As the bearing 680 supports the load of the blower 1 body while rolling an upper surface of the base 610, abrasion caused by friction between the bearing 680 and a surface of the base 610 may be reduced or prevented.

The bearing 580 according to the first embodiment of the present invention and the bearing 680 according to the second embodiment may have different structures and operating motions. However, the driving unit 500 according to the first embodiment and the driving unit 600 according to the second embodiment may otherwise have the same structure except for the bearings 580 and 680.

Figure 22:
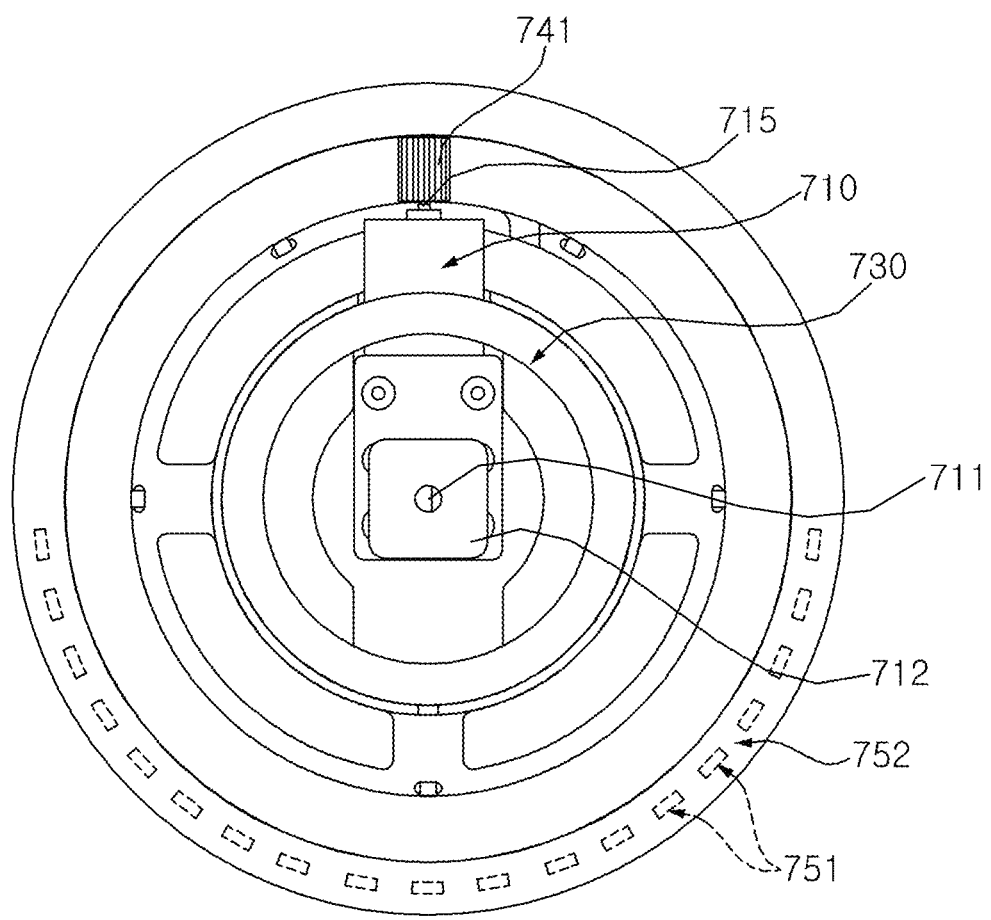
FIG. 22 is a top view of the structure shown in FIG. 21.

Hereinafter, a driving unit 700 according to a third embodiment will be described with reference to FIGS. 21 to 25. Referring to FIGS. 21 and 22, the driving unit 700 may be provided under the lower case 120 and may support the load of the blower 1. The driving unit 700 may make the blower 1 main body rotate.

The driving unit 700 may include a base 760, a motor 710 provided above the base 760 and configured to provide power, and a bearing 730 provided above the base 760 and supported by the base 760. The base 760 may be fixed to the ground, floor, or other supporting surface and not move. The motor 710 may be provided above the base 760.

A bearing installation part or support 731 protruding upward of the base 760 may be formed at the base 760. The bearing installation support 731 may have a hollow cylindrical shape. The bearing 730 may have an annular shape and may be seated on an upper side of the bearing installation support 731. The bearing 730 may be rotated on an upper side of the bearing installation support 731.

A rotation shaft installation part or support 713 may be provided inside the bearing installation support 731. The rotation shaft installation support 713 may protrude upward from the base 760. The rotation shaft installation support 713 may be provided at the center of the base 760 and may be integrally formed with the base 760.

The rotation shaft 711 extending vertically may be provided so as to be rotatable at the rotation shaft installation support 713. The rotation shaft 711 may be rotated while being inserted into the rotation shaft installation support 713. The rotation shaft installation support 713 may distribute the load of the blower 1 concentrated on the rotation shaft 711 to the base 760.

The shaft coupling member 712 to which the rotation shaft 711 is connected may be provided so as to be rotatable above the rotation shaft installation support 713. The shaft coupling member 712 may be rotated about a vertical axis together with the rotation shaft 711.

The power transmitted from the motor 710 may rotate the rotation shaft 711 and the shaft coupling member 712. The blower 1 may be rotated by the rotation of the rotation shaft 711 and the shaft coupling member 712, and the rotation shaft installation support 713 and the bearing 730 may support the load of the blower 1.

The driving motor shaft 715 connected to the motor 710 may extend in a radial direction and may be provided horizontally. The driving motor shaft 715 rotated by the driving of the motor 710 may transmit power to a power transmission member 740 (FIG. 23) described later. The motor 710 may be fixed to the base 760.

Figure 23:
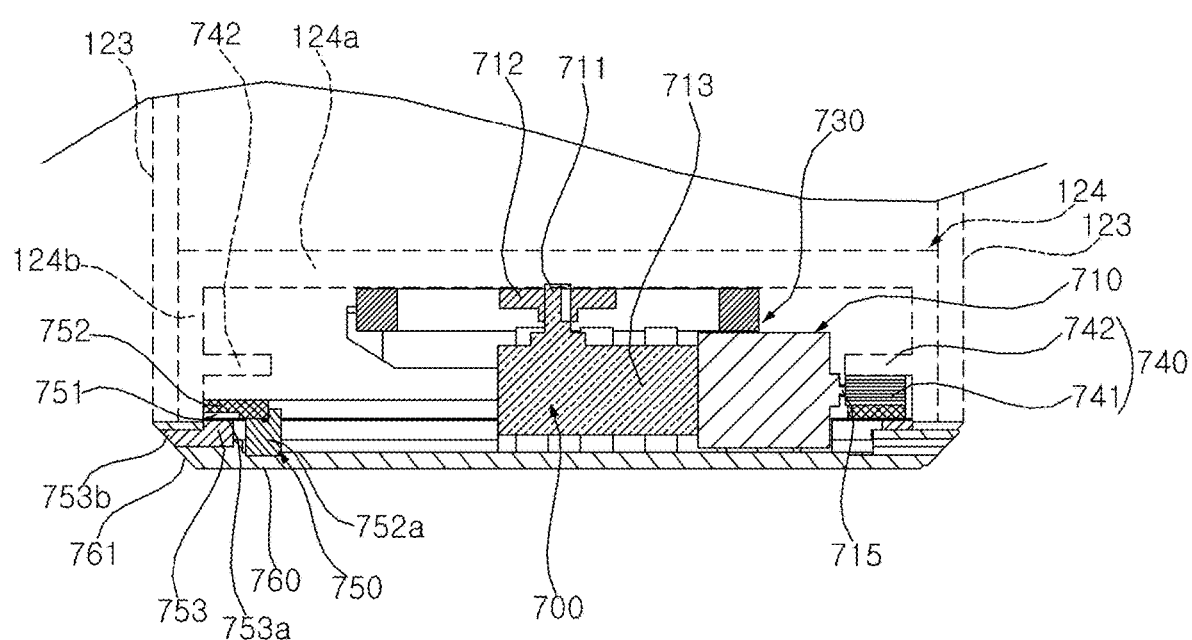
FIG. 23 is a longitudinal sectional view of a driving unit according to the third embodiment.
Figure 24:
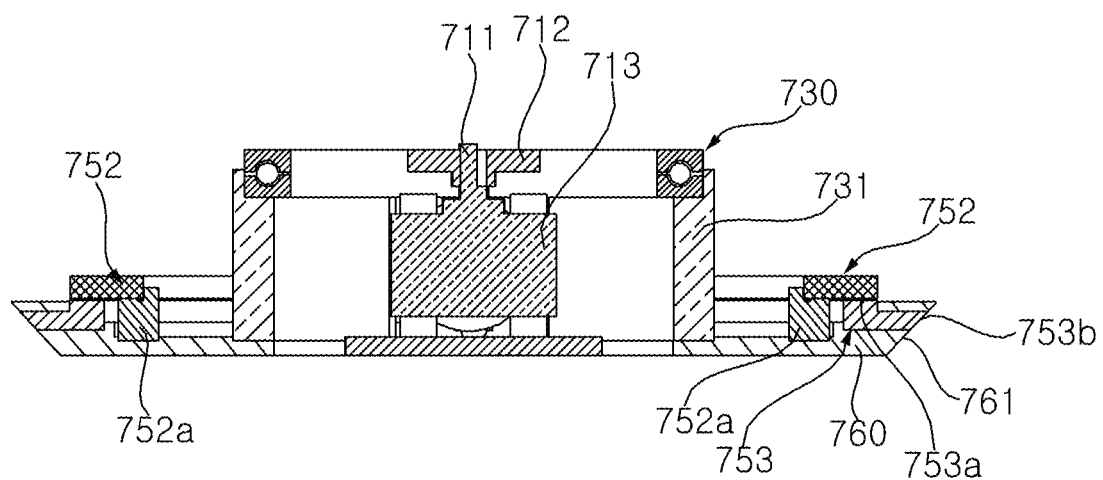
FIG. 24 is a longitudinal sectional view of the structure shown in FIG. 21.
Figure 25:
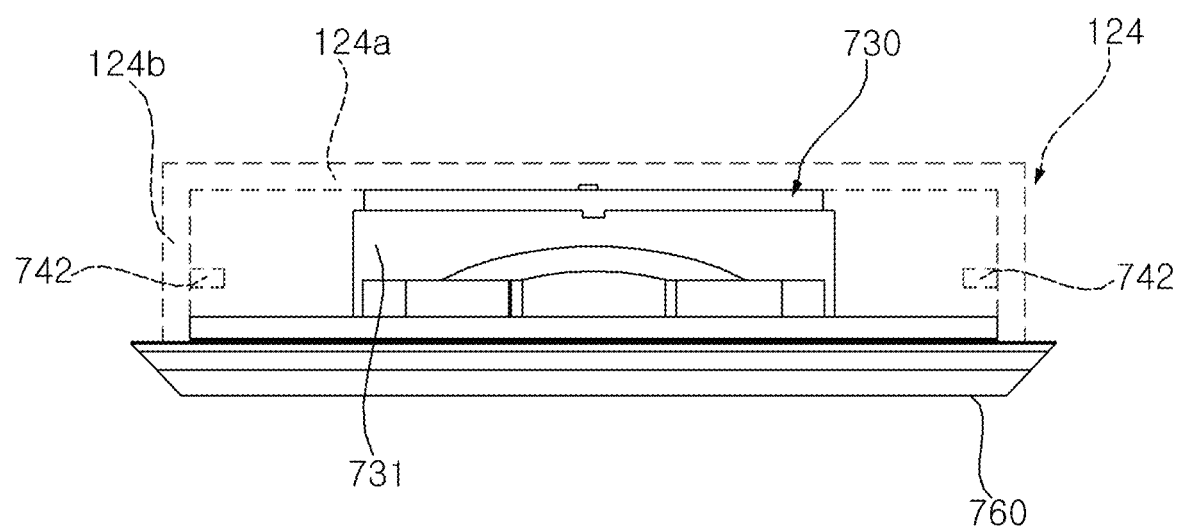
FIG. 25 is a diagram illustrating an internal structure of a part of a driving unit according to the third embodiment.

Referring to FIGS. 23 to 25, the lower case 120 may be rotated by the driving unit 700. The lower case 120 may include an outer case 123 in which a suction hole 121 is formed and an inner case 124 provided inside the outer case 123. The outer case 123 and the inner case 124 may be integrally formed.

The outer case 123 may be formed in a cylindrical shape, and the cross-sectional area may be narrower toward the upper side. The outer case 123 may form an outer shape of the lower case 120. The inner case 124 may have a cylindrical shape in which a space is formed inside. A substrate housing 160 may be provided above the inner case 124. The inner case 124 may perform a same or similar function as the rotating plates 520 and 620 in the first and second embodiments. The inner case 160 may support the entire load of the blower 1 except for the driving unit 700. The inner case 160 may rotate all structures of the blower 1 provided on an upper side of the driving unit 700.

The inner case 124 may include an upper wall 124a to which the rotation shaft 711 is assembled and a side wall 124b protruding downward from the upper wall 124a. The upper wall 124a may have a disk shape. The substrate housing 160 may be mounted on an upper side of the upper wall 124a. The rotation shaft 711 may be directly inserted into the upper wall 124a and rotated together with the upper wall 124a. The shaft coupling member 712 may be connected to the upper wall 124a to rotate the upper wall 124a.

The side wall 124b may extend in a circumferential direction of the lower case 120 and may be cylindrical to form a space inside. The side wall 124b may be connected to the outer case 123 and transmit rotational power to the outer case 123.

The power transmission member 740 may be configured to transmit power generated from the motor 710 to the inner case 124. The power transmission member 740 may include a drive gear 741 connected to the motor 710 by the drive motor shaft 715 and a rack gear 742 engaging with the drive gear 741.

The drive gear 741 may be directly connected to the motor 710 by the drive motor shaft 715 and may transmit power generated from the motor 710 to the rack gear 742. The rack gear 742 may protrude radially inward from the side wall 124b of the inner case 124. The rack gear 742 may extend in a circumferential direction, and a gear tooth protruding downward may be formed. The rack gear 742 may be formed in a ring shape or an arc shape.

The rack gear 742 may be moved in a circumferential direction by being engaged with the drive gear 741. When the rack gear 742 is moved in the circumferential direction, structures provided on an upper side of the inner case 124 may be rotated.

The bearing 730 may be provided under the inner case 124 to support the inner case. The bearing 730 may be rotated according to the rotation of the inner case 124. Thrust bearing can be used as a type of the bearing 730.

A light emitting assembly 750 providing an identification mark for rotational drive of the blower 1 will be described with reference to FIGS. 21 to 25. The light emitting assembly 750 may include a light emitting member or device 751 (e.g., a light emitting diode or an LED lamp) that emits light by receiving power, a circuit board 752 on which the light emitting member 751 is installed, and a light transmitting member or guide 753 to guide the light generated from the light emitting member 751 to an outside of the blower 1.

The circuit board 752 may be provided above the base 760 and may be formed in a ring shape or an arc shape. The circuit board 752 may be provided under the drive gear 741. The circuit board 752 may be provided between the base 760 and the lower case 120.

A substrate support rib 752a protruding upward from the base 760 may be formed at the base 760. A plurality of substrate support ribs 752a may be formed to be spaced apart from each other in a circumferential direction. The substrate support rib 752a may support the circuit board 752.

The light emitting member 751 may be installed on a lower surface of the circuit board 752 and may irradiate light toward a lower side of the circuit board 752. A plurality of light emitting members 751 may be provided to be spaced apart from each other in a circumferential direction.

The light transmitting member 753 may be provided below the lower case 120 and may be provided above the base 760. The light transmitting member 753 may be provided between the lower case 120 and the base 760.

The light transmitting member 753 may be formed in a ring shape or an arc shape. The light transmitting member 753 may be provided under the light emitting member 751.

The light transmitting member 753 may include a first surface 753a and a second surface 753. Light irradiated from the light emitting member 751 may be projected through the first surface 753a and the second surface 753b to ultimately be propagated to an outside of the blower 1.

Light projected on the first surface 753a may be refracted inside the light transmitting member 753 and proceed toward the second surface 753b. The shape of a longitudinal section of the light transmitting member 753 may be formed to be bent toward an outer side in the radial direction. The second surface 753b may extend in a circumferential direction and may form a surface continuous with an outer circumferential surface 761 of the base 760.

When power is applied to the motor 710 and the blower 1 is rotated, power may be applied to the light emitting members 751 corresponding to the range in which the blower 1 is rotated. The plurality of light emitting members 751 may be lightened simultaneously or sequentially according to the rotation of the blower 1.

This application is related to co-pending U.S. application Ser. No. 17/190,692 filed Mar. 3, 2021, now U.S. Pat. No. 11,473,593, issued Oct. 18, 2022, U.S. application Ser. No. 17/191,873 filed Mar. 4, 2021, U.S. application Ser. No. 17/197,918 filed Mar. 10, 2021, U.S. application Ser. No. 17/332,681 filed May 27, 2021, U.S. application Ser. No. 17/318,242 filed May 12, 2021, and U.S. application Ser. No. 17/318,274 filed May 12, 2021, now U.S. Pat. No. 11,624,369, issued Apr. 11, 2023, whose entire disclosures are incorporated by reference herein.

Embodiments disclosed herein may provide a bearing provided on a rotating plate that rotates while being supported by a base. A rotation of a blower may be stably supported by the base and the bearing. A plurality of bearings may be arranged to be spaced apart in a circumferential direction. A load of a body of the blower may be evenly distributed among the plurality of bearings, thereby improving the life of the bearing.

A frictional resistance generated between the rotating plate and the base may be reduced or eliminated by maintaining a vertical gap between the rotating plate and the base by the bearing. A rotational support structure may be compact by utilizing an empty space formed at an inner side of the bearing as a space in which the first gear and the second gear are arranged. Since a first gear and a second gear may be provided at an inner side of the bearing, the power transmission path may be shortened, thereby reducing the power required for rotation.

The bearing may be prevented from being separated from a rotation path during rotation by a rail structure guiding a rotation path of the bearing. By passing a wire through a center of the rotation shaft, the wire may not be twisted during rotation. A substrate and the motor may be collectively arranged on an upper side of the rotating plate so that integrated management of electrical components is possible.

The effects of the embodiments disclosed herein are not limited to the above-mentioned effects, and other effects that are not mentioned will be clearly understood by those skilled in the art from the description of the claims. Although the embodiments have been disclosed for illustrative purposes, those skilled in the art will appreciate that various modifications, additions and substitutions are possible, without departing from the scope and spirit of the invention as disclosed in the accompanying claims. Accordingly, the scope of the present disclosure is not construed as being limited to the described embodiments but is defined by the appended claims as well as equivalents thereto.

Embodiments disclosed herein may provide a blower in which a rotational drive is stably supported. Embodiments disclosed herein may provide a blower having a support structure with improved durability. Frictional resistance due to rotation may be reduced or minimized.

Embodiments disclosed herein may provide a blower in which a structure supporting rotational drive is compacted. The blower may reduce or minimize the power required for rotation.

Embodiments disclosed herein may provide a blower in which removal of a structure by rotation may be prevented. Embodiments disclosed herein may provide a blower that is prevented from twisting the wire due to rotation. Embodiments disclosed herein may provide a blower capable of integrated management of electric parts.

The problems of the present invention are not limited to the problems mentioned above, and other problems that are not mentioned will be clearly understood by those skilled in the art from the description.

Embodiments disclosed herein may provide a blower including a base, a case provided above the base and having an air inlet and an air outlet, and a fan provided inside the case. The blower may include a rotating plate connected to the case and rotatably provided on an upper side of the base, a motor generating power to rotate the rotating plate, and a bearing provided between the rotating plate and the base, fixed to the rotating plate, and movably supported on the base, so that a separate housing to receive the bearing is not required and the rotating plate can be rotated stably because the bearing may be directly supported on the base.

The motor may be supported by the rotating plate so that N arrangement position of the motor may not be limited to a specific area. The motor may be fixed to the upper side of the rotating plate so as to rotate together with the rotating plate, thereby increasing a utilization of a space formed under the rotating plate.

At least a part of the motor may be inserted into the motor insertion groove that is opened in the vertical direction on the rotating plate so that a phenomenon that the motor is removed during rotation may be prevented. The blower may further include a rail provided on the upper side of the base and extending along the rotational direction of the rotating plate.

The bearing may be provided on the upper side of the rail and may be moved along the extending direction of the rail so that the bearing's rotation path can be guided by rail. The blower may include a first gear connected to the motor and fixed to the rotating plate and a second gear engaged with the first gear and fixed to the base. The first gear may be moved along the circumference of the second gear.

The bearing may be provided farther from the rotation center of the rotating plate than the first gear so that a position where the gear is engaged is formed close to the rotation center, thereby reducing or minimizing a power transmission path transmitted through the gear. The first gear, the second gear, and the rail may be arranged side by side in a horizontal direction so that a height of the driving unit may be reduced.

The blower may further include a shaft bearing, at least a part of which is rotated together with the rotating plate, thereby preventing or reducing abrasion of the rotating plate. The shaft bearing may be provided so as to surround the shaft holder so that vibration of the rotating plate may be prevented through double support by the shaft holder and the shaft bearing.

The blower may further include a shaft body rotatably coupled to the base. The blower may further include a shaft holder protruding toward the base from the rotation center of the rotating plate. The shaft body may be inserted into the shaft holder and fixed to the rotating plate.

The rotating plate may include a stem forming a space inside and a roof having a shaft insertion hole through which the shaft body passes and covering the space at the top of the shaft. At least a part of the shaft body may pass through the shaft insertion hole and may be located inside the space, thereby preventing the shaft body from being separated from the rotation center.

The shaft body may penetrate the shaft holder. The shaft holder may include a crest protruding radially inward and a body fastening hole opened in the vertical direction at the crest, and it may be possible to improve the compatibility of the shaft holder and the shaft body.

The rail may protrude upward from an upper surface of the base and may form a gap between the rotating plate and the base so that the gap between the rotating plate and the base may be maintained. The rotating plate may include a first seating portion on which the motor is seated, a second seating portion provided outside the first seating portion and on which the case is seated, and a stepped portion connecting the first seating portion and the second seating portion so that the case can be stably fixed to the rotating plate. The bearing may include a wheel rotatably supported on the base and a support shaft penetrating the wheel and fixed to the rotating plate. The motor may be spaced apart from the outside of the rotation center of the rotating plate.

At least one of the plurality of bearings may be provided at a position opposite to the motor based on the rotation center of the rotating plate, thereby preventing a phenomenon in which a center of gravity is concentrated on a specific portion.

When the rotating plate is rotated, the bearing may be moved along the rotational direction of the rotating plate while being rotated around the support shaft so that wear of the bearing due to friction can be reduced or minimized through rotational motion by two rotating shafts. The support shaft may extend in the vertical direction.

A part of the lower surface of the bearing may be in contact with the base, and the rest may be spaced upward from the base, thereby reducing or minimizing abrasion of the bearing due to rotation. The support shaft may extend in a radial direction of the rotating plate.

The bearing may be moved along the rotational direction of the rotating plate while the circumferential surface is in contact with the base so that wear of the bearing due to friction may be reduced or minimized through rolling motion.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A blower comprising:
a base; and
a main body disposed above the base and including a case where an air inlet and an air outlet are formed,
wherein the main body includes:
a rotating plate disposed below the case, and rotatably disposed with respect to the base;
a motor provided at the rotating plate;
a first gear connected to the motor and disposed between the rotating plate and the base;
a shaft holder protruding from a center portion of the rotating plate toward the base; and
a bearing disposed between the rotating plate and the base, fixed to the rotating plate, and movably supported by the base, and
wherein the base comprises:
a rail protruding from an upper surface of the base, extending in a circumferential direction, and movably supporting the bearing;
a second gear protruding from the upper surface of the base, extending in the circumferential direction, and engaging with the first gear; and
a rotating shaft housing protruding from the upper surface of the base toward the rotating plate, and into which the shaft holder is inserted, and
wherein the first gear, the second gear, the rail, and the bearing are disposed inside of an area defined as a vertical width of the shaft holder and the rotating shaft housing.

2. The blower of claim 1, wherein the bearing comprises:
a support shaft protruding from the rotating plate toward the base; and
a wheel rotating around the support shaft, and
wherein the support shaft is arranged not to be aligned with the rail in a vertical direction, and
wherein a side surface of the wheel contacts the rail.

3. The blower of claim 2,
wherein the support shaft provides a vertical axis of rotation so that the wheel rotates in a horizontal direction, and
wherein the side surface of the wheel contacts an upper surface of the rail.

4. The blower of claim 3,
wherein the rail has a vertical height, and
wherein the wheel is spaced apart from the upper surface of the base by the vertical height of the rail.

5. The blower of claim 3,
wherein the support shaft is disposed radially outside of the rail, and
wherein a radial inner portion of the side surface of the wheel based on the support shaft is in contact with the upper surface of the rail.

6. The blower of claim 2,
wherein the support shaft provides a horizontal axis of rotation so that the wheel rotates in a vertical direction, and
wherein the side surface of the wheel contacts a side surface of the rail.

7. The blower of claim 6,
wherein a circumferential surface of the wheel contacts the upper surface of the base.

8. The blower of claim 6,
wherein the rail includes:
   a first the rail disposed radially inside than the bearing; and
   a second the rail disposed radially outside than the bearing, and
wherein an inner side surface of the wheel is in contact with an outer side surface of the first rail, and an outer side surface of the wheel is in contact with an inner side surface of the second rail.

9. The blower of claim 1,
wherein the motor is disposed above the rotating plate, and
wherein a driving shaft of the motor vertically penetrates the rotating plate, protrudes downward from the rotating plate, and is connected to the first gear.

10. The blower of claim 1,
wherein the rotating shaft housing, the second gear, and the rail are sequentially arranged radially outward from a center of the base.

11. The blower of claim 10,
wherein a rotation axis of the bearing is disposed radially outside the rail.

12. The blower of claim 10,
wherein the first gear moves along a circumference of the second gear at a radial outside of the second gear.

13. The blower of claim 1,
wherein a plurality of ribs protruding toward the base are formed on the rotating plate; and
wherein at least some of the plurality of ribs are accommodated between the rotating shaft housing and the second gear, or between the second gear and the rail.

14. A blower comprising:
a base; and
a main body disposed above the base and including a case where an air inlet and an air outlet are formed, and
wherein the main body includes:
   a rotating plate disposed below the case, and rotatably disposed with respect to the base;
   a motor provided at the rotating plate;
   a first gear connected to the motor and disposed between the rotating plate and the base;
   a shaft holder protruding from a center portion of the rotating plate toward the base; and
   a bearing disposed between the rotating plate and the base, fixed to the rotating plate, and movably supported by the base, and
wherein the base comprises:
   a rail protruding from an upper surface of the base, extending in a circumferential direction, and movably supporting the bearing;
   a second gear protruding from the upper surface of the base, extending in the circumferential direction, and engaging with the first gear; and
   a rotating shaft housing protruding from the upper surface of the base toward the rotating plate, and into which the shaft holder is inserted; are formed, and
wherein the rotating shaft housing, the second gear, and the rail define a plane having a vertical thickness in which the rotating shaft housing, the second gear, and the rail are accommodated, and
wherein at least a part of each of the shaft holder, the first gear, and the bearing is disposed inside the plane.

* * * * *